United States Patent [19]

Eldridge

[11] Patent Number: 4,518,379

[45] Date of Patent: May 21, 1985

[54] APPARATUS AND METHOD FOR JOINING INDIVIDUAL BLANKS

[75] Inventor: Charles W. Eldridge, Beverly, Mass.

[73] Assignee: Melvin B. Herrin, Meadowbrook, Pa.

[21] Appl. No.: 334,585

[22] Filed: Dec. 28, 1981

[51] Int. Cl.³ .............................................. B31B 17/02
[52] U.S. Cl. .................................... 493/334; 156/157; 156/509
[58] Field of Search ...................... 493/379, 84, 94, 76, 493/67, 344, 343, 334; 156/157, 509, 546

[56] References Cited

U.S. PATENT DOCUMENTS

| | | | |
|---|---|---|---|
| 966,834 | 8/1910 | Hobbs | 493/84 |
| 1,293,782 | 2/1919 | Hren et al. | 493/334 |
| 1,651,249 | 11/1927 | Bridgman . | |
| 2,068,163 | 1/1937 | Bowersock et al. . | |
| 2,217,306 | 10/1940 | Burril | 154/42 |
| 2,223,325 | 11/1940 | Larney | 493/379 X |
| 2,358,789 | 9/1944 | Carruth . | |
| 2,625,085 | 1/1953 | Bergstein . | |
| 2,671,382 | 3/1954 | Vogt | 493/344 |
| 2,693,742 | 11/1954 | Hartman | 493/379 X |
| 2,698,645 | 1/1955 | Bathon et al. | 154/42 |
| 2,764,123 | 9/1956 | Derderian | 118/216 |
| 2,801,578 | 8/1957 | Bayley . | |
| 2,979,995 | 4/1961 | Bergstein et al. . | |
| 3,266,389 | 8/1966 | Gentry | 493/84 X |
| 3,399,509 | 9/1968 | Greco et al. | 53/388 |
| 3,769,136 | 10/1973 | Ospelt | 156/308 |
| 3,902,587 | 9/1975 | Checcucci | 198/34 |
| 3,992,982 | 11/1976 | Huiskes | 493/418 X |
| 4,019,624 | 4/1977 | Torres | 198/459 |
| 4,023,471 | 5/1977 | Royal . | |
| 4,050,972 | 9/1977 | Cardinal, Jr. | 156/71 |
| 4,171,666 | 10/1979 | Swenson et al. | 493/344 X |
| 4,379,114 | 4/1983 | Fujiki et al. | 156/157 X |
| 4,410,575 | 10/1983 | Obayashi et al. | 156/157 X |

Primary Examiner—James F. Coan
Attorney, Agent, or Firm—Lerner, David, Littenberg, Krumholz & Mentlik

[57] ABSTRACT

An apparatus and method is described for aligning and joining individual blanks together along an overlapping portion thereof by a bonding agent. The individual blanks are conveyed within the apparatus, and at least a portion of one blank is displaced away from at least a portion of the other blank in order to allow the blanks to be arranged such that one blank is positioned overlapping the displaced portion of the other blank so that the blanks can be joined together by a bonding agent provided therebetween upon contact of the overlapping portions of the blanks.

36 Claims, 30 Drawing Figures

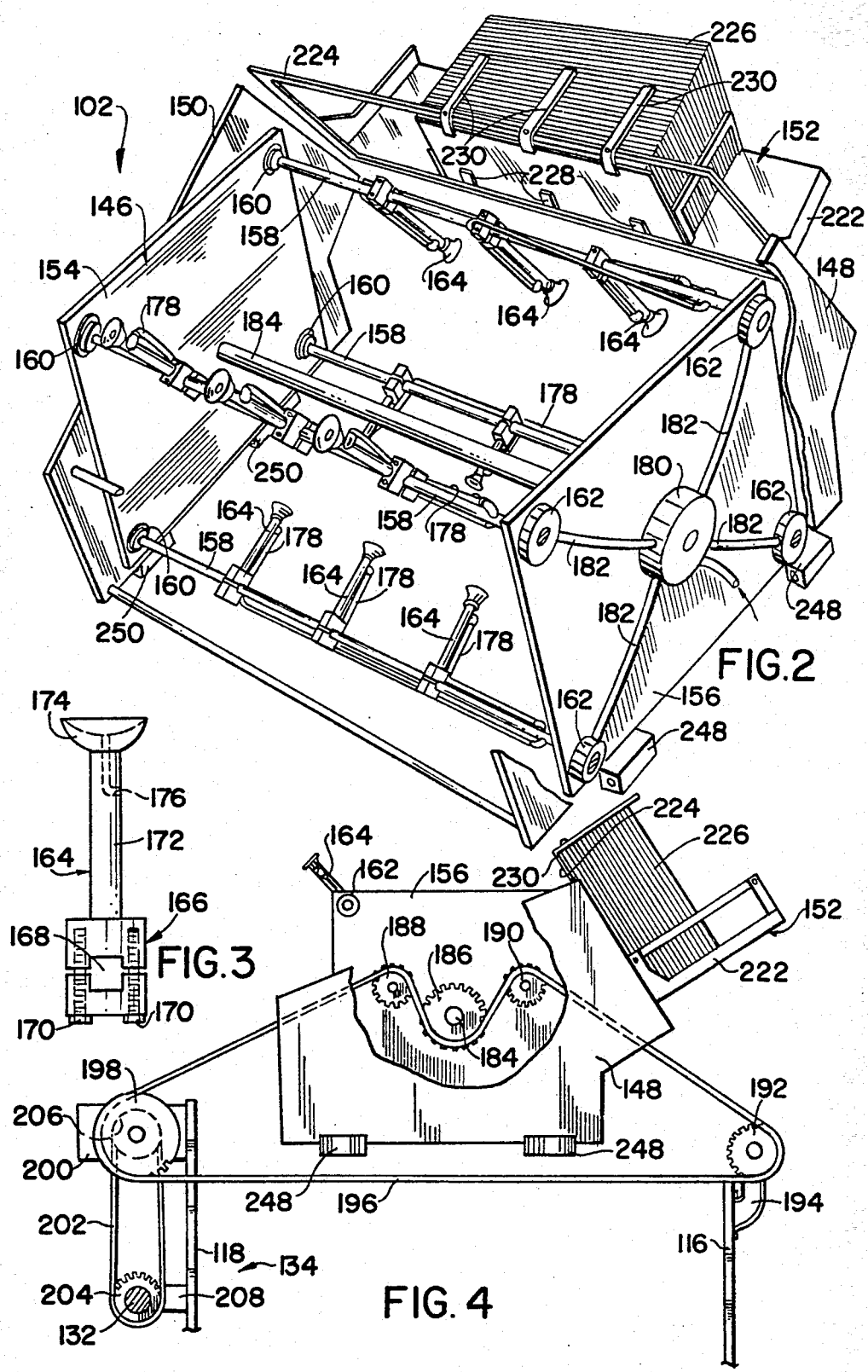

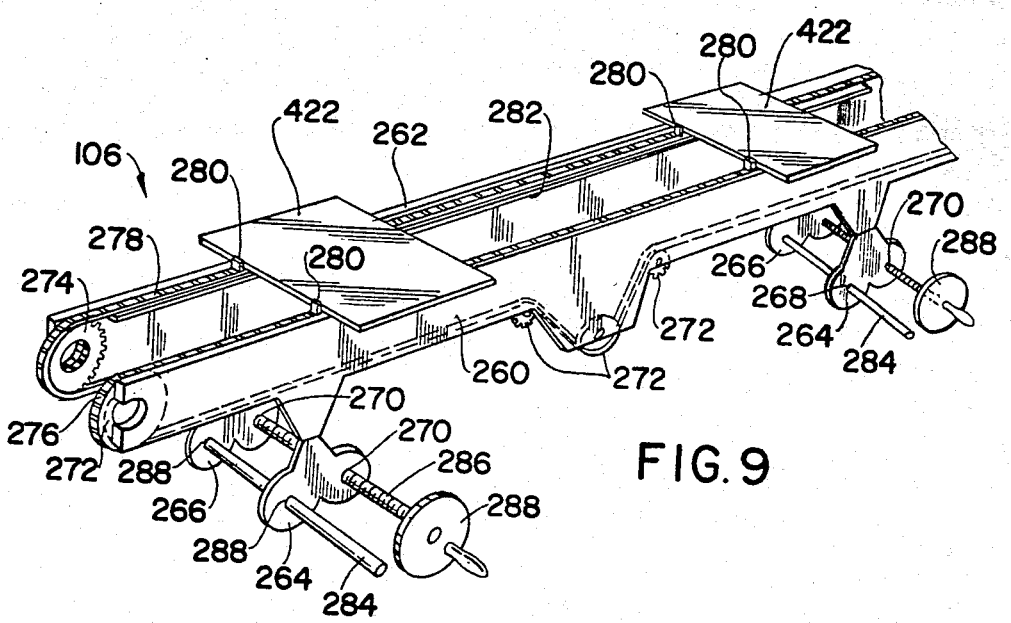
FIG. 9
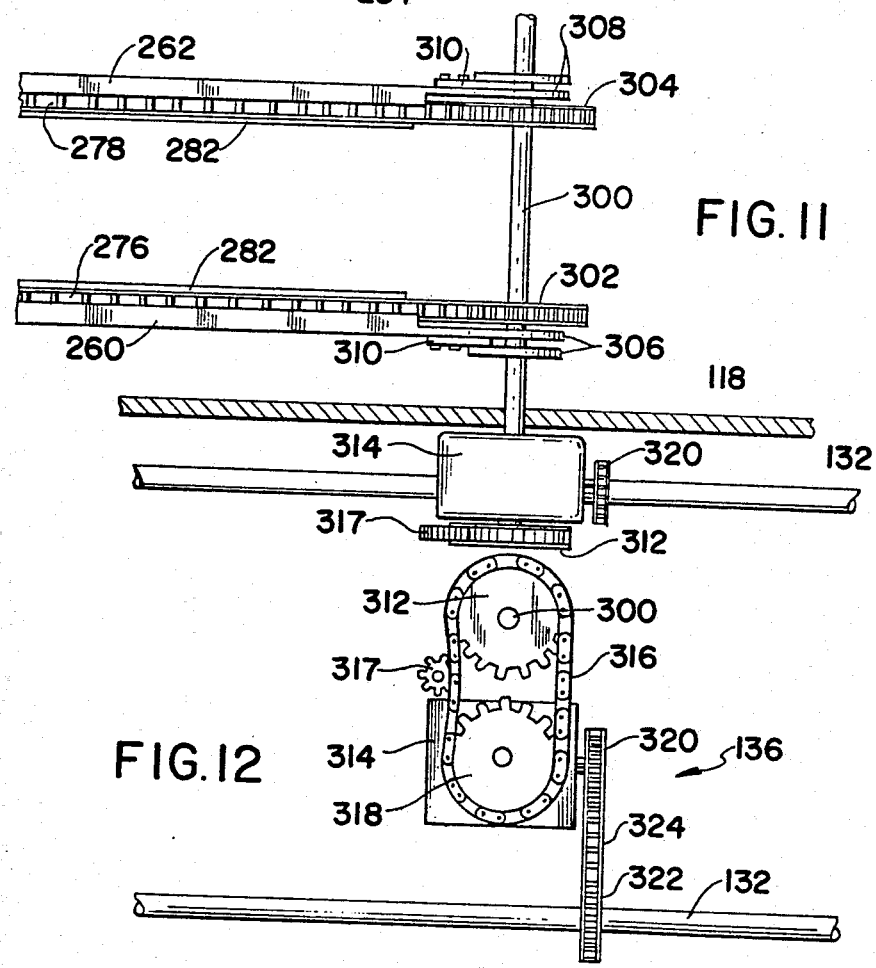
FIG. 11
FIG. 12

APPARATUS AND METHOD FOR JOINING INDIVIDUAL BLANKS

BACKGROUND OF THE INVENTION

The present invention relates in general to an apparatus and method for joining blanks together and, more particularly, to an apparatus and method for aligning and joining individual blanks together along an overlapping portion thereof by a suitable bonding agent provided therebetween.

The apparatus and method of the present invention may be used to manufacture a variety of products, including containers, file folders and a number of other items for which one piece of rigid or semi-rigid material need be attached to another. In the manufacture of storage and/or package-type containers, e.g., product display packages and the like, such containers are generally constructed from one or more blanks of suitable material folded into the appropriate shape of the desired container by an apparatus constructed for such purpose. Ultimately, such blanks are secured in their folded shape by a bonding agent provided along their mating portions. One such novel container constructed in part from a transparent plastic blank is that described in U.S. Pat. application Ser. No. 175,404, filed on Aug. 5, 1980 and assigned to the same assignee as that of the present invention. Such package provides the retailer with a number of advantages over conventional all-cardboard packages, for example, visual display of the product, limited protection of the product from deterioration as, for example, by atmospheric moisture or other causes, pilfer-proof protection, and protection of the product from rough handling both in shipment and by potential customers.

One form of such partially transparent package described in the above-mentioned patent application is constructed to include a rear wall of paperboard, cardboard or the like, which rear wall may have printing and/or decorative material applied to either face thereof with information in regard to the product, instructions for use of the product, the application of a trademark associated with the product, etc. The construction of such a novel partially transparent package initially requires that the transparent plastic blank be bonded along a portion thereof in overlapping relationship to a portion of the rear wall. Prior to the bonding operation, however, the transparent plastic blank and rear wall must be appropriately aligned such that the finally-formed package will be appropriately positioned with respect to the rear wall and in registration with any printing and/or decoration thereon.

There has heretofore been generally unknown an apparatus which is suitably adapted to perform the function of aligning and bonding individual blanks together in the manner required in the construction of the above-noted packages. In this regard, illustrative is U.S. Pat. No. 2,625,085 which discloses an apparatus for assembling composite containers of the knock-down or collapsible folding type. A panel blank of transparent material is supplied from a hopper and placed onto a moving platform carried along by a conveyor. A pair of locating fingers secured to the conveyor capture the leading edge of the panel blank to cause aligned placement of the panel blank on the platform between a plurality of circumferential vertically extending alignment pins which are secured to the platform and conveyor. An adhesive applicator of the wheel or disc type applies a layer of suitable adhesive along the lateral top side portions of the panel blank as the conveyor and platform move the panel blank into proper registration under the adhesive applicator. A pair of side-forming blanks of paperboard or cardboard material are aligned overlapping the lateral top side portions of the transparent panel blank via the circumferential pins extending through alignment apertures provided in the side-forming blanks. The side-forming blanks are accordingly bonded to the panel blank by the adhesive provided therebetween and by a compressive force applied to the overlapping portion by a pressing device constructed from a plurality of pressure bearing blocks secured to a moving chain aligned over the overlapping portion. The thus-formed planar composite container can then be folded along its appropriate score lines into the final container shape.

The composite container assembling apparatus of the above-described prior art construction includes a number of notable disadvantages. For example, such apparatus requires the use of projecting locating fingers and alignment pins which, by their natural extension, can be easily damaged or broken during operation of the apparatus. In the event such condition goes unnoticed by the operator of the apparatus, the panel and side-forming blanks will generally be improperly positioned within the apparatus such that the resulting assembled composite containers will be defective rendering them unusable with their associated economic loss. As noted, the side-forming blanks are required to be provided with a plurality of apertures to effect the alignment of the side-forming blanks with the panel blank via the alignment pins. In this regard, the presence of such apertures is considered objectionable where they are readily visible in the assembled container by detracting from the container's aesthetic appearance.

In addition, the thus-described prior art composite container assembling apparatus is not readily adaptable to be employed with panel and side-forming blanks of varying sizes. In this regard, each of the plurality of platforms, locating fingers and aligning pins must be individually adjusted over the entire conveyor assembly each time a panel blank or side-forming blank of different size is incorporated into a composite container using such apparatus. In many cases the apparatus described in the prior art is not at all adaptable to the joining of blanks of certain configurations. In this regard, it is to be noted that such apparatus requires that the bonding agent be applied to the entire length of the top side of the panel blank and that the side forming blank then be placed on top of the bonding agent. The present inventions allows for the placement of the bonding agent and blanks on either the top or the bottom of each other. Also, with the use of an automatic glue gun, the bonding agent need not be applied along the entire length of the blank; rather, it may be applied only to those areas where it is needed. In addition, the use by the apparatus of the prior art of alignment pins outside the body of the panel blank requires that some portion of the side forming blank overlap the edge of the panel blank. With the present invention there is no such requirement, as the surface area of one blank may fall entirely within the surface area of the other blank, with no overlap over the edge.

Further, the use of such locating fingers and aligning pins results in a slower operation of such apparatus along with an associated loss of output. In particular, the need for placement of the side forming blanks over the alignment pins would generally necessitate the use of an uneven slow intermittent motion operation as opposed to the smooth high speed continuous operation of the present invention.

Accordingly, it can be appreciated that there is need for an apparatus and method for joining individual blanks together which is adaptable to blanks of varying sizes and, in which such apparatus operates accurately, flexibly, cheaply, continuously and rapidly, and at a minimum of expense.

SUMMARY OF THE INVENTION

It is broadly an object of the present invention to provide an apparatus and method for joining individual blanks together which overcomes or avoids one or more of the foregoing disadvantages resulting from the use of the above-mentioned composite container assembling apparatus and which fulfills the requirements of an apparatus and method for joining individual blanks together in an accurate and uncomplicated manner. Specifically, it is within the contemplation of the present invention to provide an apparatus and method for aligning and joining individual blanks together along an overlapping edge portion thereof by a suitable bonding agent.

A further object of the present invention is to provide an apparatus for joining individual blanks together which operates accurately, cheaply and rapidly, and at a minimum of expense.

A still further object of the present invention is to provide an apparatus and method for joining individual blanks together wherein such blanks are prealigned with respect to each other prior to their being joined by a suitable bonding agent.

A yet still further object of the present invention is to provide an apparatus and method for aligning and joining individual blanks together wherein such blanks are conveyed along substantially parallel paths in a substantially common plane during the aligning and joining thereof.

In accordance with one embodiment of the present invention, there is provided an apparatus for joining individual blanks together. Such apparatus comprises means for providing a first and second blank; means for displacing at least a portion of the first blank away from at least a portion of the second blank and, means for arranging the first and second blanks such that the displaced portion of the first blank is arranged in alignment with a portion of the second blank such that the blanks can be joined together in alignment by a bonding agent provided therebetween.

In accordance with the above embodiment, the displacing means is adapted to bend a portion of the first blank away from a plane containing the remaining portion thereof.

Further in accordance with the above embodiment, the arranging means includes means for conveying the first and second blanks along substantially parallel paths in a substantially common plane; and, wherein the conveying means includes first and second register chain assemblies and first and second carrier assemblies.

Still further in accordance with the above embodiment, means are provided for applying a compressive force along an overlapping portion of the first and second blanks to maintain the blanks in joined relationship.

Still even further in accordance with the above embodiment, the arranging means includes means for conveying the blanks along converging non-parallel paths towards a common plane until the blanks converge and are joined together.

In accordance with another embodiment of the present invention, there is provided an apparatus for joining individual first and second planar blanks together in overlapping relationship along a portion thereof. Such apparatus comprises means for individually providing a first and second blank from a source thereof; means for receiving the first and second blank from the providing means and for conveying the blanks along substantially parallel paths in a substantially common plane; means for displacing a portion of one of the blanks away from the common plane containing the remaining portion of the one blank; and, means for positioning the first and second blanks such that a portion of the other blank is adapted to align overlapping the displaced portion of the one blank so that the blanks can be joined together by a bonding agent provided therebetween upon contact of the overlapping portions.

In accordance with the last-mentioned embodiment, means are provided for maintaining the first and second blanks in contact with the receiving means while the blanks are conveyed therealong.

In accordance with still another embodiment of the present invention there is provided a method for joining individual blanks together. Such method comprises the steps of providing a first and second blank; displacing at least a portion of the first blank away from at least a portion of the second blank; arranging the first and second blanks such that the displaced portion of the first blank is arranged in alignment with a portion of the second blank such that the blanks can be joined together in alignment by a bonding agent provided therebetween.

In accordance with the last-mentioned embodiment, the method includes conveying the first and second blanks along substantially parallel paths in a substantially common plane during the aligning and joining thereof.

Further, in accordance with the last-mentioned embodiment, the method further includes applying a compressive force along the joined portion of the first and second blanks to maintain such blanks in joined relationship.

Still further in accordance with the last-mentioned embodiment, the method further includes conveying the blanks along converging non-parallel paths towards a common plane until the blanks converge and are joined together.

Still even further in accordance with the last-mentioned embodiment, the method includes further displacing the displaced portion of the first blank from its displaced position back into a plane containing at least a portion of the second blank and into contact with the overlapping portion of the second blank to join the blanks together in overlapping relationship.

In accordance with yet still another embodiment of the present invention, there is provided a method for joining individual first and second blanks together in overlapping relationship along a portion thereof. Such method comprises the steps of individually providing a first and second blank from a source thereof; receiving a first and second blank from the providing means and conveying the blanks along substantially parallel paths in a substantially common plane; applying a bonding agent along a portion of one of the blanks; displacing a portion of one of the blanks away from the common plane containing the remaining portion of the one blank; positioning the first and second blanks such that a portion of the other blank is adapted to align overlapping the displaced portion of the one blank such that the blanks are joined together by the bonding agent upon contact of the overlapping portion of the blanks; and, applying a compressive force along the overlapping portion of said first and second blanks to maintain said blanks in joined relationship for a sufficient period to allow the bonding agent to secure the blanks together.

BRIEF DESCRIPTION OF THE DRAWINGS

The above description, as well as further objects, features and advantages of the present invention, will be more fully understood by reference to the following detailed description of a presently preferred but nonetheless illustrative apparatus and method for joining individual blanks in accordance with the present invention when taken in conjunction with the accompanying drawings, wherein:

FIG. 2 is a perspective view of a blank feeding device constructed from a blank picker having a plurality of rotatable vacuum grabbers operatively associated with a supply of blanks for engagement therewith;

FIG. 3 is a side elevation of a vacuum grabber as shown in FIG. 2;

FIG. 4 is a partial right side elevation of the blank feeding device as shown generally in FIG. 2 showing the gear and chain drive assembly for rotating the blank picker about its central axis;

FIG. 9 is a perspective view of a register chain assembly as shown in FIG. 1 constructed from a pair of parallel-spaced frame members operatively assembled by a pair of slide and threaded rods;

FIG. 11 is a top elevation of the operative association of the register chain assembly as shown in FIG. 9 having a drive shaft connected thereto for operation thereof;

FIG. 12 is a side elevation of the gear and chain drive assembly for coupling the drive shaft as shown in FIG. 11 to the main drive shaft as shown in FIG. 1;

DETAILED DESCRIPTION

As thus far described, the present invention relates to an apparatus and method for aligning and joining individual blanks together along an overlapping edge portion thereof by a suitable bonding agent provided therebetween. Specifically, the apparatus of the present invention has been described as adapted to the bonding of such blanks in the construction of storage and/or package-type containers, e.g., transparent product display packages and the like. As such, the apparatus of the present invention is suitably adapted to align and bond a transparent plastic blank and a rear wall of paperboard, cardboard or the like. As noted, the rear wall may have printing and/or decorative material applied to either face thereof with various types of consumer information such as instructions and/or manufacturer identification such as a trademark, etc.

It is further contemplated that the apparatus and method of the present invention are suitably adapted for providing an economic means of forming larger blanks from a plurality of smaller blanks, in particular, where it is required that only a portion of the larger blanks have the above-noted printing and/or decorating thereon. In this regard, where only a portion of a larger blank is required to have such printing and/or decorating thereon, it is feasible to provide that portion as a separate smaller blank to be printed and/or decorated and subsequently joined with one or more other such blanks to form an overall composite larger blank by use of the apparatus and method of the present invention. In this manner, it is contemplated that there would be realized great economic and time-saving advantages in eliminating the need to handle and process larger blanks where only a portion thereof is required to be printed and/or decorated. Thus, it is clear to one skilled in the art that the apparatus and method of the present invention has a general universal application where it is required to join a plurality of individual blanks together.

Figure 1:
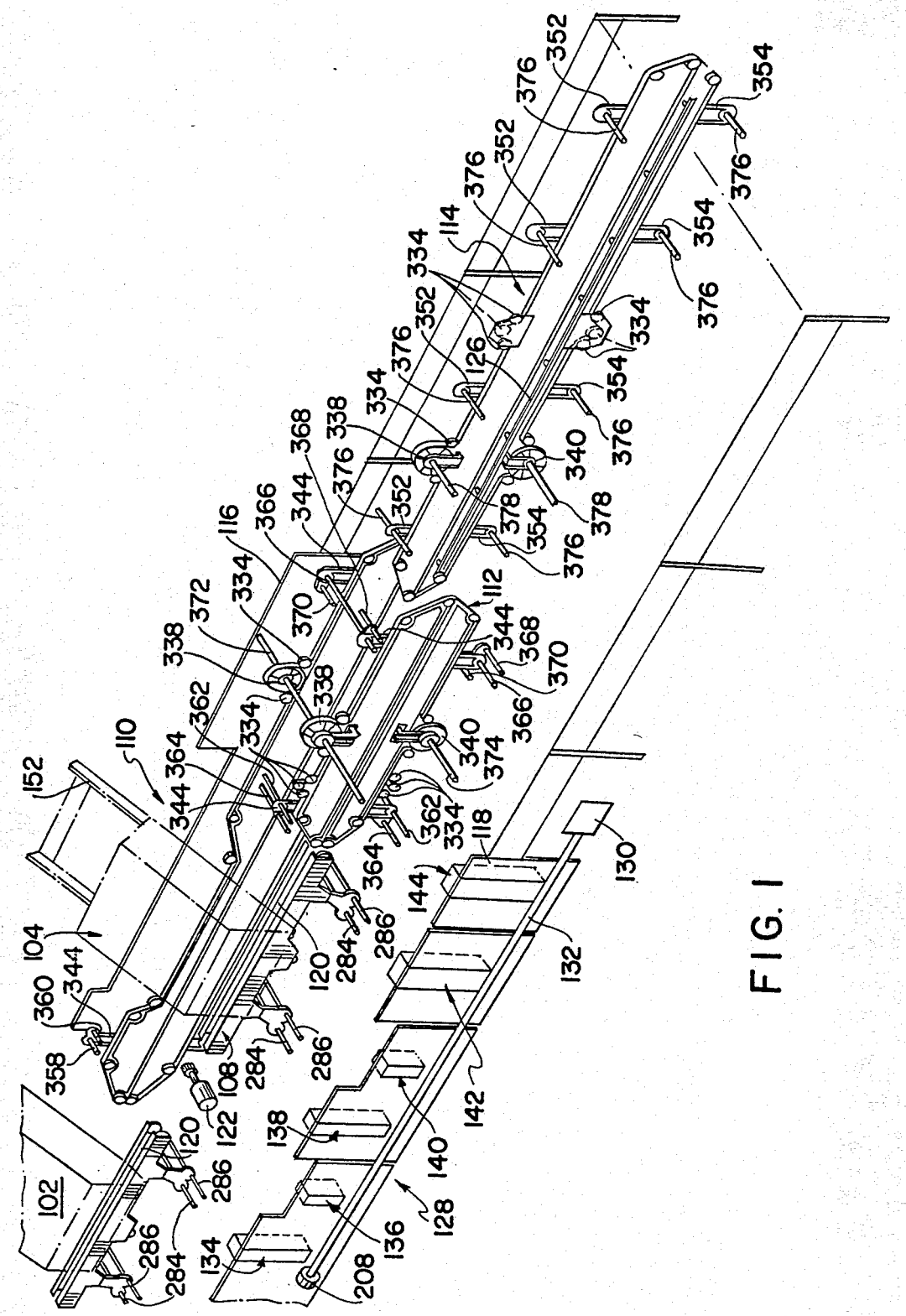
FIG. 1 is a perspective view of an apparatus for joining individual blanks together constructed from a pair of blank feeding devices respectively overlying a pair of register chain assemblies operatively associated with three longitudinally extending carrier assemblies; and, a common main drive shaft operative of such register chain assemblies, carrier assemblies and the blank feeding devices.

Referring specifically to the drawings, the apparatus and method of the present invention will now be described in greater detail. The overall construction of the apparatus of the present invention will be described with reference to FIG. 1; a detailed description of the assemblies and subassemblies of such apparatus will be described with reference to FIGS. 2 through 19; and, the specific operation of such apparatus in joining individual blanks together will be described in detail generally with reference to FIGS. 20a through 20k. Referring now to the drawings in which like reference characteristics represent like elements, there is shown in FIG. 1 a joining apparatus designated generally by reference character 100. The joining apparatus 100 is generally constructed from a pair of blank feeding devices 102, 104 adjustably positioned overlying a respective one of a pair of register chain assemblies 106, 108, which register chain assemblies are arranged in operative association with a plurality of longitudinally extending carrier assemblies 110, 112, 114. The blank feeding devices 102, 104, the register chain assemblies 106, 108 and the carrier assemblies 110, 112, 114 are all adjustably positioned between the right and left main side frames 116, 118 in a manner to be described hereinafter.

The joining apparatus 100 further includes a vacuum table 120 in operative association with each of the register chain assemblies 106, 108, an adhesive applicator 122 positioned between the pair of blank feeding devices 102, 104 adjacent the carrier assembly 110, a longitudinally extending displacing bar 124 (see generally FIGS. 20a–20g) positioned generally extending between the register chain assembly 108 and carrier assembly 110, and longitudinally extending pontoons 126 secured to either side of the carrier assembly 114. The blank feeding devices 102, 104, register chain assemblies 106, 108 and carrier assemblies 110, 112, 114 are operatively driven in times relationship by a main drive assembly generally designated by reference number 128. The main drive assembly 128, as to be described in greater detail hereinafter, is generally constructed to include a single electric motor 130 coupled to a common main drive shaft 132, which drive shaft is operatively coupled to a plurality of gear and chain drive assemblies 134, 136, 138, 140, 142, 144. The main drive assembly 128 is suitably supported by the left main side frame 118. As to be described, the gear and chain drive assemblies 134, 136, 138, 140, 142, 144 are operatively coupled to the blank feeding devices 102, 104, the register chain assemblies 106, 108 and the carrier assemblies 110, 112, 114 for timed synchronized operation thereof.

The detailed construction of the various components of the joining apparatus 100, as shown in perspective in FIG. 1, will now be described with reference to FIGS. 2 through 19. Specifically referring to FIG. 2, a blank feeding device 102 is shown in greater detail. It is noted that each of the blank feeding devices 102, 106 are of identical construction; however, such identical construction of the blank feeding devices is not considered a limitation of the present invention. The blank feeding device 102 is constructed generally from a blank picker 146 rotatably secured between right and left support walls 148, 150 and a blank supply hopper 152 adjustably secured between the right and left support walls at the rear edges thereof. The blank picker 146 in turn is constructed from a pair of parallel-spaced sidewalls 154, 156 having a support rod 158 rotatably secured between each of the corresponding corners thereof by a bearing 160 at each corner of the sidewall 154 and a vacuum bearing 162 at each corner of the sidewall 156. Secured spaced intermittently along each of the support rods 158 are a plurality of vacuum grabbers 164 adapted for rotation therewith.

The construction of the vacuum grabbers 164 are shown in greater detail in FIG. 3. The vacuum grabbers 164 are constructed from a split separable body member 166 defining a central opening 168 therein when secured together by suitable bolts 170. The opening 168 is adapted to engage the support rod 158 and to be secured thereto by engagement of the body member 166 upon the tightening of bolts 170. Secured to the body member 166 is a rod 172 having a suction cup 174 attached to the free end thereof. A passageway 176 is provided within the rod 172 and in communication with the circular opening of the suction cup 174. The suction cup 174 is connected to a vacuum source through passageway 176 by a vacuum supply line 178. The vacuum supply line 178 is connected in communication with a hollow portion provided within one end of each of the support rods 158, which hollow portion is arranged in communication with the vacuum bearing 162. Each of the vacuum bearings 162 are provided in communication with the vacuum source through a vacuum manifold 180 connected to each of the vacuum bearings by a respective manifold supply line 182. As apparent from FIG. 2, each support rod 158 has attached thereto three vacuum grabbers 164 in communication with the vacuum manifold 180 through a respective vacuum bearing 162. Although three such vacuum grabbers 164 have been shown, any lesser or greater number of such vacuum grabbers may be provided along each support rod 158 as generally required by the size of the blank to be fed thereby.

The blank picker 146 is rotatably secured between the parallel-spaced support walls 148, 150 by an axial shaft 184 extending through the sidewalls 154, 156, the vacuum manifold 180 and being journaled at their ends to the support walls by suitable bearings. Referring to FIG. 4, one of the gear and chain drive assemblies 134, 136 which is operative to rotate a respective blank picker 146 of the blank feeding devices 102, 104 in a clockwise direction about its shaft 184 is shown. A shaft gear 186 is secured to the shaft 184 between sidewall 156 and right support wall 148. A pair of take-up gears 188, 190 are journaled to the inside of the right support wall 148 on opposite sides of the shaft gear 186. A rear gear 192 is journaled to a support bracket 194 attached to the right main side frame 116 in general alignment with the shaft gear 186 and take-up gears 188, 190. A chain 196 is provided in engagement with a drive gear 198, the shaft gear 186, the pair of take-up gears 188, 190 and the rear gear 192 to cause rotation of the blank picker 146 in a clockwise direction about shaft 184 in response to the rotation of the drive gear.

Figure 5:
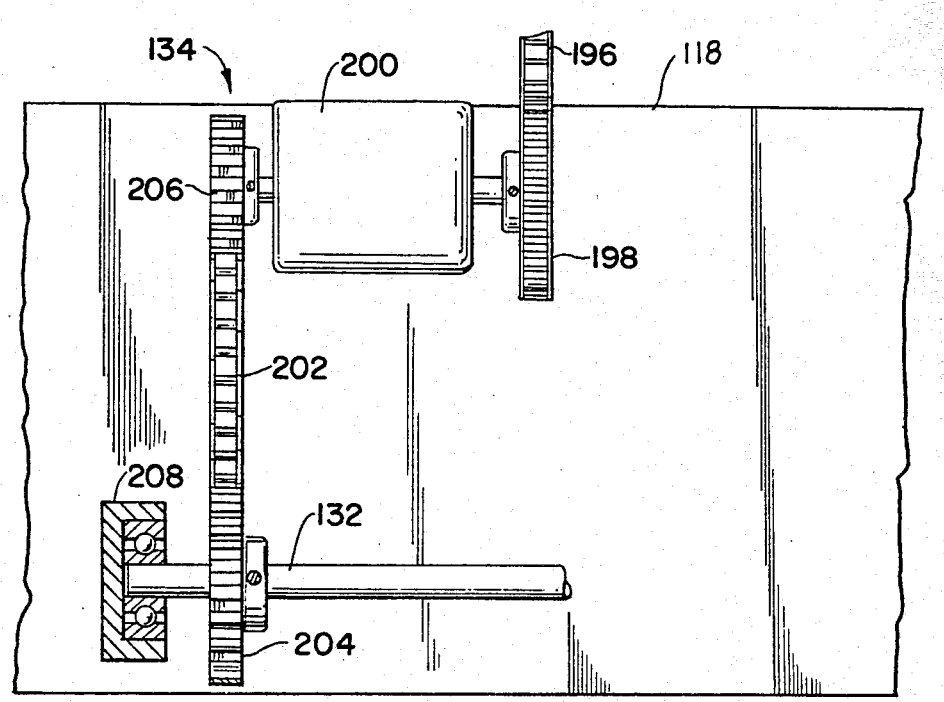
FIG. 5 is a side elevation of that portion of the gear and chain drive assembly as shown in FIG. 4 which couples to the main drive shaft through a gear reducer.

As best shown in FIG. 5, the drive gear 198 is connected to one side of the gear reducer 200 which is secured to the left side frame 118. The drive gear 198 is coupled to the main drive shaft 132 by chain 202 linking gear 204 connected to the main drive shaft and gear 206 connected to the other side of the gear reducer 200. As further shown in FIG. 5, the end of the main drive shaft 132 is supported in a end bearing cap 208 attached to the lower portion of the left main side frame 118. It is readily apparent that rotation of the main drive shaft 132 causes rotation of the drive gear 198 via gears 204, 206, chain 202 and gear reducer 200 to cause rotation of chain 196 and ultimately the rotation of the blank picker 146 in a clockwise direction.

Figure 6:
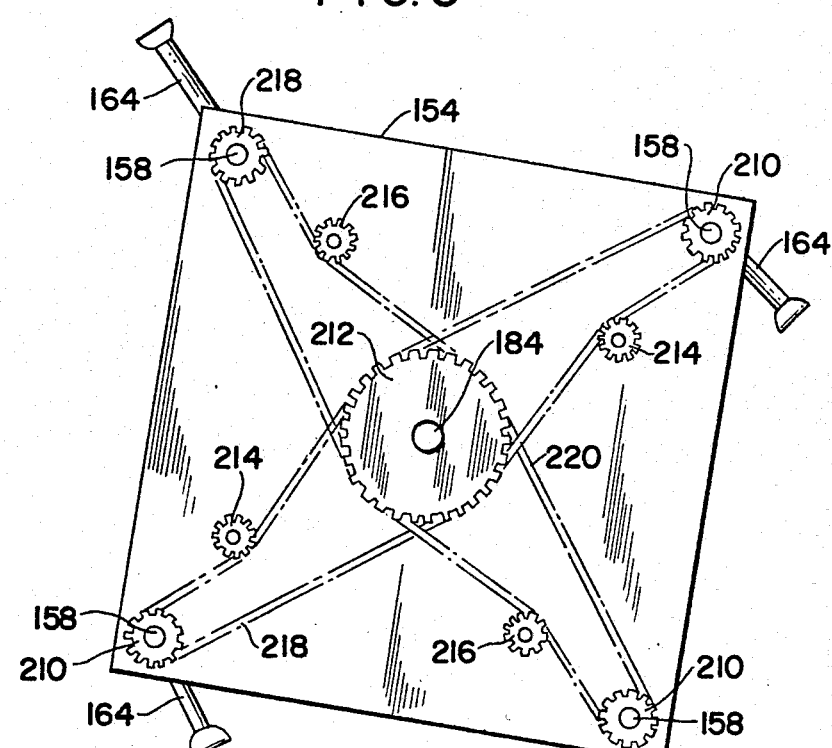
FIG. 6 is a partial left side elevation of the blank feeding device as shown in FIG. 2 showing the gear and chain drive assembly for causing circular rotation of the individual vacuum grabbers about their respective common support rods.

Referring to FIG. 6, there will now be described the gear and chain drive assembly which is operative to rotate the support rods 158 and the attached vacuum grabbers 164 in a counterclockwise direction. Secured to the end of the support rods 158 on the outside of the sidewall 154 of the blank picker 146 are gears 210. A double gear 212 is connected to the shaft 184 and two pairs of take-up gears 214, 216 are journaled to the sidewall 154 between the double gear 212 and the gears 210. A pair of chains 218, 220 are respectfully provided over diagonally opposed gears 210, the double gear 212 and a respective one of the pairs of take-up gears 214, 216. In this manner, rotation of the shaft 184 by the shaft gear 186 via chain 196 causes rotation of the double gear 212 and counterclockwise rotation of the vacuum grabbers 164 secured to the support rods 158 via gears 210 and their respective chains 218, 220.

As shown in FIGS. 2 and 4, adjustably secured to the rear of the right and left support walls 148, 150 of the blank feeding device 102 is a blank supply hopper 152. The blank supply hopper 152 is generally constructed from a base support 222 and a front frame 224 secured thereto. A supply of blanks 226 are supported in a stack along their bottom edge in a generally vertical inclined position by the base support 222 and maintained in a stack by the engagement of a plurality of lower fingers 228 and a plurality of upper fingers 230 adjustably secured to the front frame 224 so as to engage the first blank of the stack. The supply of blanks 226 are centrally positioned between the right and left support walls 148, 150 of the blank feeding device 102 for engagement with the suction cup 174 of the vacuum grabbers 164 as the blank picker 146 is rotated about the shaft 184.

Figure 7:
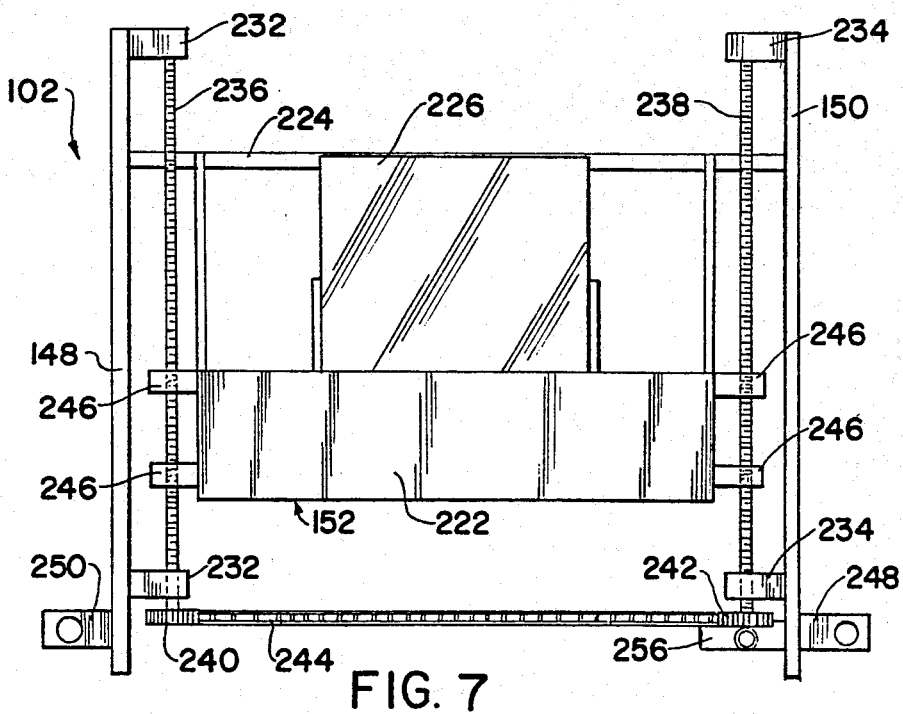
FIG. 7 is a partial rear elevation of the blank feeding device as shown in FIG. 2 showing the blank supply hopper adjustably secured thereto.

The blank supply hopper 152 is adjustably secured to the right and left support walls 148, 150 as shown in FIG. 7. Attached to the right and left support walls 148, 150 are a pair of threaded support blocks 232, 234 each having an aligned threaded opening therethrough. Threadably engaged within each of the pair of threaded support blocks 232, 234 is a respective threaded rod 236, 238 having gears 240, 242 secured at the respective lower end thereof. A chain 244 is provided in engagement with the gears 240, 242 to cause simultaneous rotation of the threaded rods 236, 238 in the adjustment of the blank supply hopper 152 with respect to the blank picker 146. The blank supply hopper 152 includes a threaded support block 246 attached to either side thereof having a threaded opening therein which respectfully receives one of the threaded rods 236, 238 for adjustment thereof. In this regard, rotation of one of the gears 240, 242 causes simultaneous rotation of the threaded rods 236, 238 which adjustably move the blank supply hopper 152 generally behind and central to the blank picker 146 such that the suction cups 174 of the vacuum grabbers 164 are in proper alignment with the first blank in the supply of blanks 226 for individual removal of such blanks therefrom.

Figure 8:
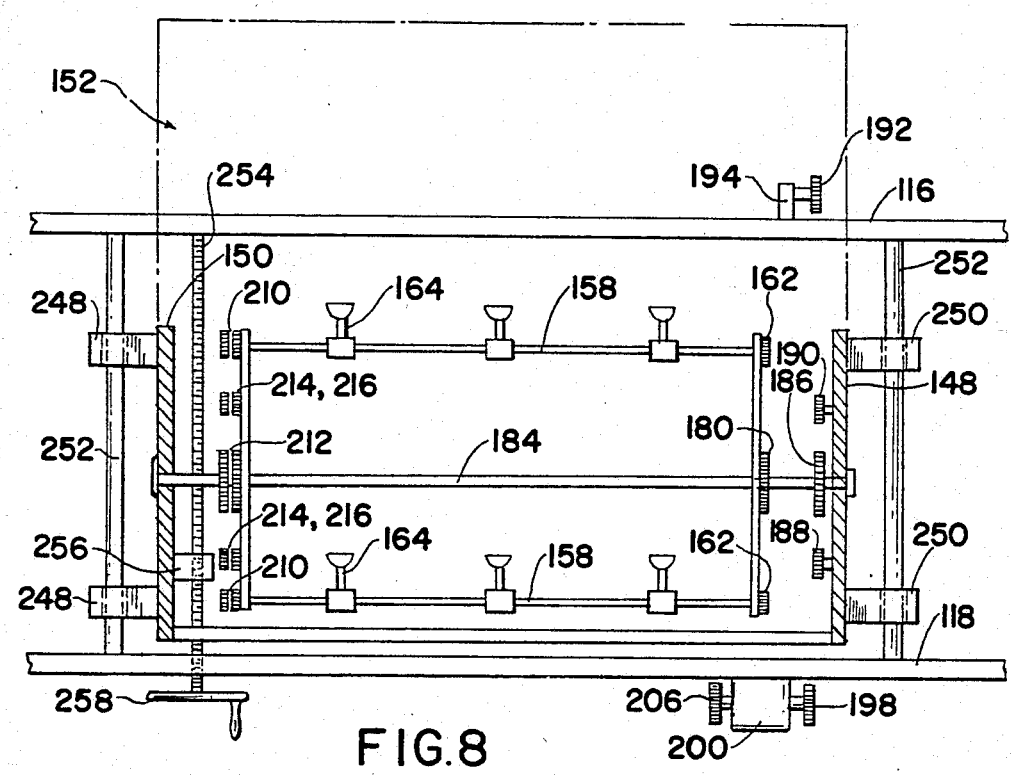
FIG. 8 is a partial top elevation of the blank feeding device as shown in FIG. 2 showing the blank feeding device being adjustably secured between the left and right main side frames of the apparatus of the present invention.

The adjustable positioning of the blank feeding device 102 as shown in FIG. 2 within the joining apparatus 100 will now be described with reference to FIG. 8. Specifically referring to FIG. 8, the blank feeding device 102 is positioned generally overlying the joining apparatus 100 between the right and left main side frames 116, 118. Secured to the lower edge of the right and left support walls 148, 150 of the blank feeding device 102 are pairs of support blocks 248, 250 having a central opening therethrough. A slide rod 152 is secured transversely between the right and left main side frames 116, 118 on either side of the blank feeding device 102 and slidably engaging the opening within the support blocks 248, 250. A threaded rod 254 is rotatably secured transversely to the right and left main side frames 116, 118 and in operative engagement within a threaded opening provided in a threaded support block 256 secured to the left support wall 150 of the blank feeding device 102. A handle 258 is attached to the end of the threaded rod 254 on the outside of the left main side frame 118. It is readily apparent that rotation of the threaded rod 254 via the handle 258 causes the blank feeding device 102 to adjustably move transversely between the right and left main side frames 116, 118 by the sliding engagement of the pair of support blocks 248, 250 with a respective slide rod 252.

The construction of the blank feeding device 102 has thus far been described in detail. In this regard, it is noted that the blank feeding device 104 is constructed in the same manner. Accordingly, a separate description of the blank feeding device 104 is not provided. However, it is noted that it is not a requirement of the present invention that the blank feeding devices 102, 104 be of identical construction, nor is it a requirement that either of the blank feeding devices be of the rotary grabber type described above. The blank feeding devices 102, 104 can be of different construction where the blanks being supplied mandate such a different construction. The general operation of the blank feeding devices 102, 104 in removing individual blanks by the vacuum grabbers 164 will be generally described hereinafter.

Referring to FIG. 9, there will now be described the detailed construction of the register chain assemblies 106, 108, which register chain assemblies are of identical construction. Accordingly, the detailed construction of register chain assembly 106 will only be described herein. The register chain assembly 106 is constructed from a pair of parallel-spaced frame members 260, 262 having a pair of mounting and adjusting brackets 264, 266 secured at either lower end thereof. Provided within each of the pairs of mounting and adjusting brackets 264, 266 are an opening 268 and an adjacent threaded opening 270. Journaled along the inside face of the frame member 260 are a plurality of gears 272 and journaled along the inside face of the frame member 262 are a plurality of corresponding gears 274. Operatively linking the gears 272, 274 together are a respective chain 276, 278. Each of the chains 276, 278 are provided with a plurality of vertically extending lugs 280 intermittently positioned therealong. The lugs 280, as secured to each of the chains 276, 278, are in general alignment so as to engage the rear edge of a blank when such blank is deposited overlying the top edge of the frame members 260, 262 via the operation of the blank picker 156. In this regard, the lugs 280 being secured to the chains 276, 278 slidably move a blank along the register chain assembly 106. The chains 276, 278 are generally supported along the top edge of the frame members 260, 262 by a support bracket 282 attached thereto.

The register chain assemblies 106, 108 are adjustably secured to the joining apparatus 100 in a similar manner to that previously described with reference to the blank feeding devices 102, 104. Specifically, slide rods 284 are transversely secured between the right and left main side frames 116, 118 and extend through aligned openings 268 within adjacent pairs of mounting and adjusting brackets 264, 266. Threaded rods 286 are rotatably secured transversely between the right and left main side frames 116, 118 in threadable engagement within aligned threaded openings 270 of adjacent pairs of mounting and adjusting brackets 264, 266. A handle 288 is secured to the end of each threaded rod 286 on the outside of the left main side frame 118. It is readily apparent that rotation of the threaded rod 286 via handle 288 effectively causes the simultaneous transverse movement of each frame member 260, 262 of the register chain assemblies 106, 108 in cooperation with the sliding engagement of each slide rod 284 within the openings 268 of the mounting and adjusting brackets 264, 266. As such, the register chain assemblies 106, 108 can be separately adjusted at their forward and rear end between the right and left main side frames 116, 118 so as to properly receive a blank from the blank picker 146 and convey same to a preselected location within the joining apparatus 100 as to be described hereinafter.

Figure 10:
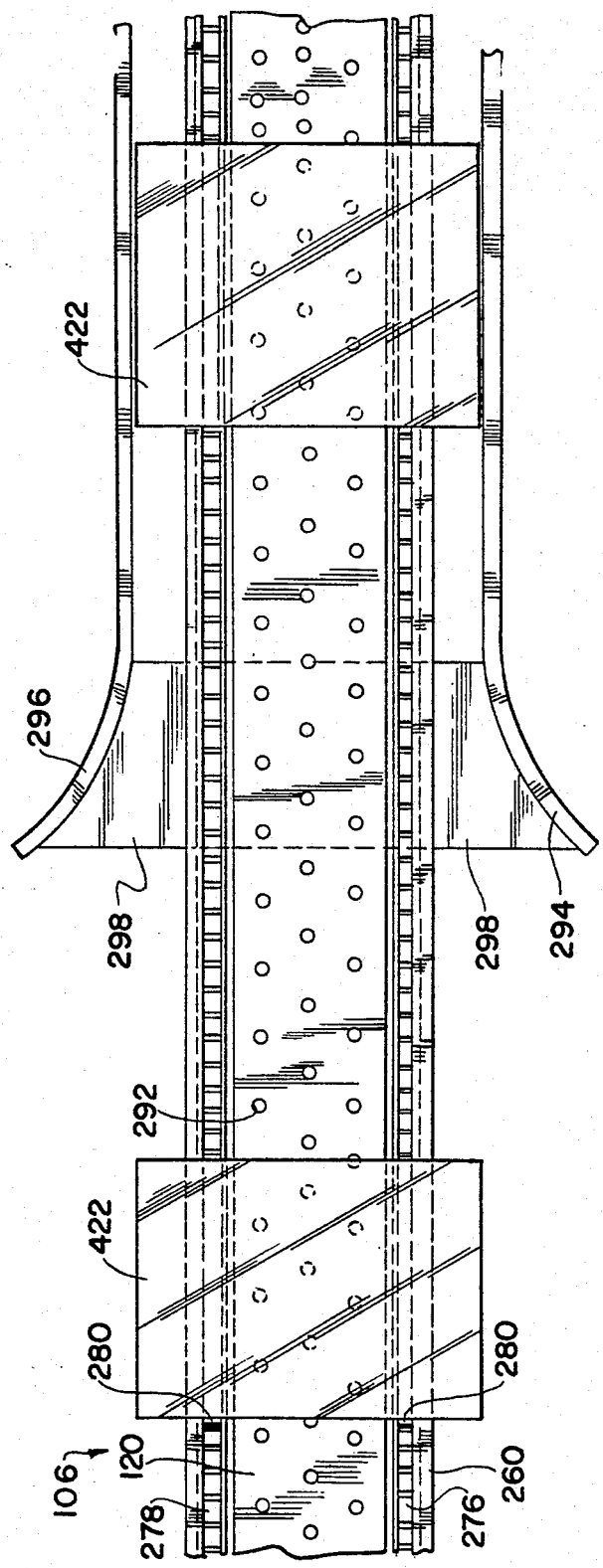
FIG. 10 is a partial top elevation of the register chain assembly as shown in FIG. 9 further showing a vacuum table positioned between the frame members and a pair of alignment guides disposed on either side thereof.

Referring to FIG. 10, additional features of the construction of the register chain assemblies 106, 108 are shown. Specifically, it has been found that blanks conveyed along the top edge of the frame members 260, 262 by lugs 280 have a tendency to float and bounce thereby promoting general misalignment of the blank during the conveying operation. In order to eliminate this condition, optionally, a vacuum table 120 is positioned between the frame members 260, 262 and include a plurality of openings 292 therein. The top surface of the vacuum table 120 is positioned slightly below the bottom surface of the blank such that vacuum created in the vacuum table is communicated through the openings 292 to exert a gentle downward pulling force upon the blank thereby holding the blank in a stable aligned condition while being conveyed along the register chain assemblies 106, 108. However, it is appreciated that where the operation of the register chain assemblies 106, 108 do not promote floating or bouncing of the blank during the conveying operation, the vacuum table 120 may be eliminated. Further, a pair of curved alignment guides 294, 296 are secured to either side of the frame members 260, 262 by brackets 298. The alignment guides 294, 296 are arranged such that their curved end operate to receive therebetween an incoming blank conveyed along the carrier chain assemblies 106, 108. In this regard, the alignment guides 294, 296 are operative to position the incoming blank to be adapted to align in proper overlapping relationship for the subsequent bonding operation to be described hereinafter.

The coupling of the register chain assemblies 106, 108 to the main drive shaft 132 of the joining apparatus 110 will now be described with reference to FIGS. 11 and 12. Specifically referring to FIG. 11, a drive shaft 300 is rotatably secured transverse between the right and left main side frames 116, 118 having attached thereto a pair of gears 302, 304 and a pair of parallel-spaced flanges 306, 308. Each of the pair of gears 302, 304 are operatively linked to a respective one of the chains 276, 278 for coordinated movement thereof in operation of the register chain assemblies 106, 108. The register chain assemblies 106, 108 are maintained in alignment with the pair of gears 206, 208 by a slide member 310 secured to the end of the frame members 260, 262 and slidably received between the parallel-spaced flanges 306, 308. In this regard, the frame members 260, 262 of the register chain assemblies 106, 108 are always maintained in proper alignment with the pair of gears 302, 304 for proper driving of the chains 276, 278 for smooth and continuous conveying of a blank therealong by the plurality of lugs 280.

The drive shaft 300 is coupled to the main drive shaft 132 by the gear and chain assemblies 136, 140 as shown in FIG. 12. A drive gear 312 is attached to the drive shaft 300 and coupled to a gear reducer 314 via chain 316, take-up gear 317 and gear 318 attached to the gear reducer. The gear reducer 314 includes an additional gear 320 positioned in alignment with a gear 322 secured to the main drive shaft 132 and operatively coupled thereto by a chain 324. In this regard, rotation of the main drive shaft 132 causes rotation of the drive shaft 300 for operation of the chains 276, 278 of the register chain assemblies 106, 108. In addition, it is pointed out that the construction, alignment and operation of the register chain assembly 108 is in an identical manner to that of register chain assembly 106.

Figure 13:
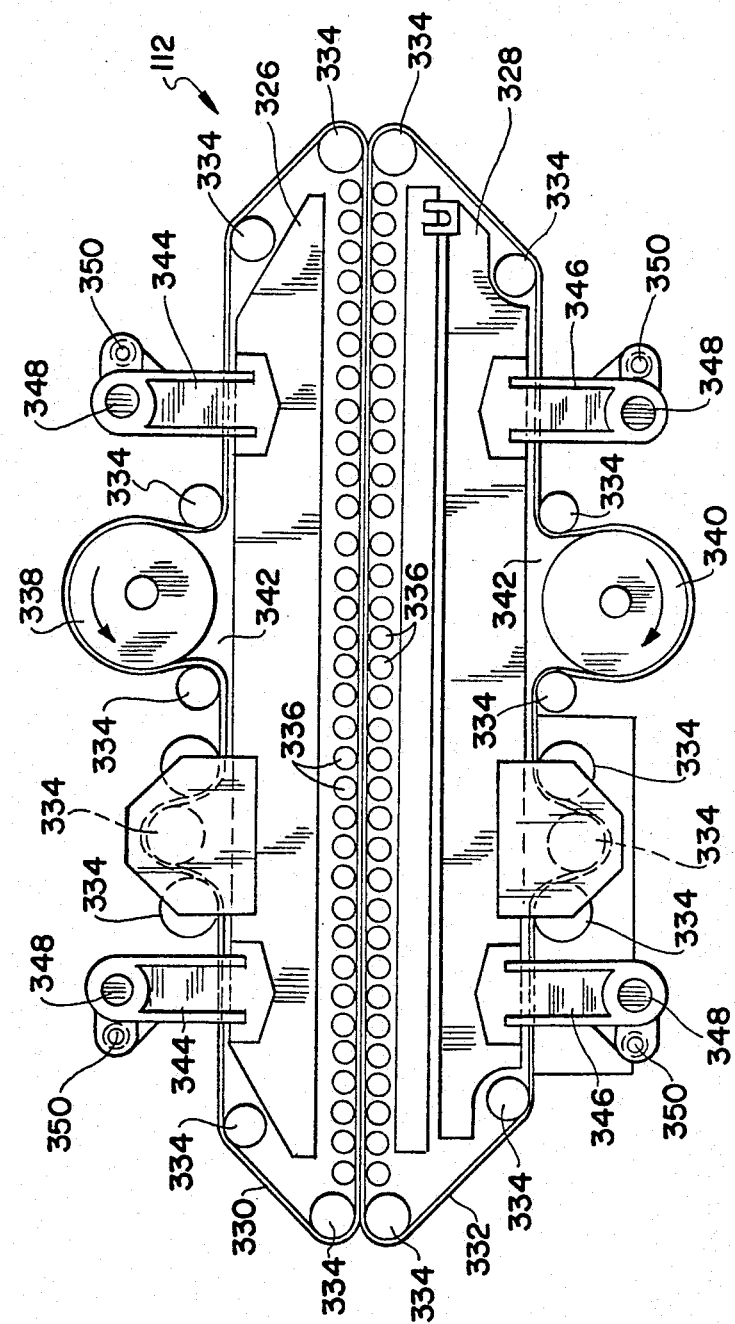
FIGS. 13, 14 and 15 are side elevations of the carrier assemblies as shown in FIG. 1 constructed generally similar to include an upper and lower carrier member having a belt driven around the respective circumference thereof by individual belt driving wheels, and wherein such belts are supported in their opposed relationship by a plurality of spring-loaded rollers.
Figure 14:
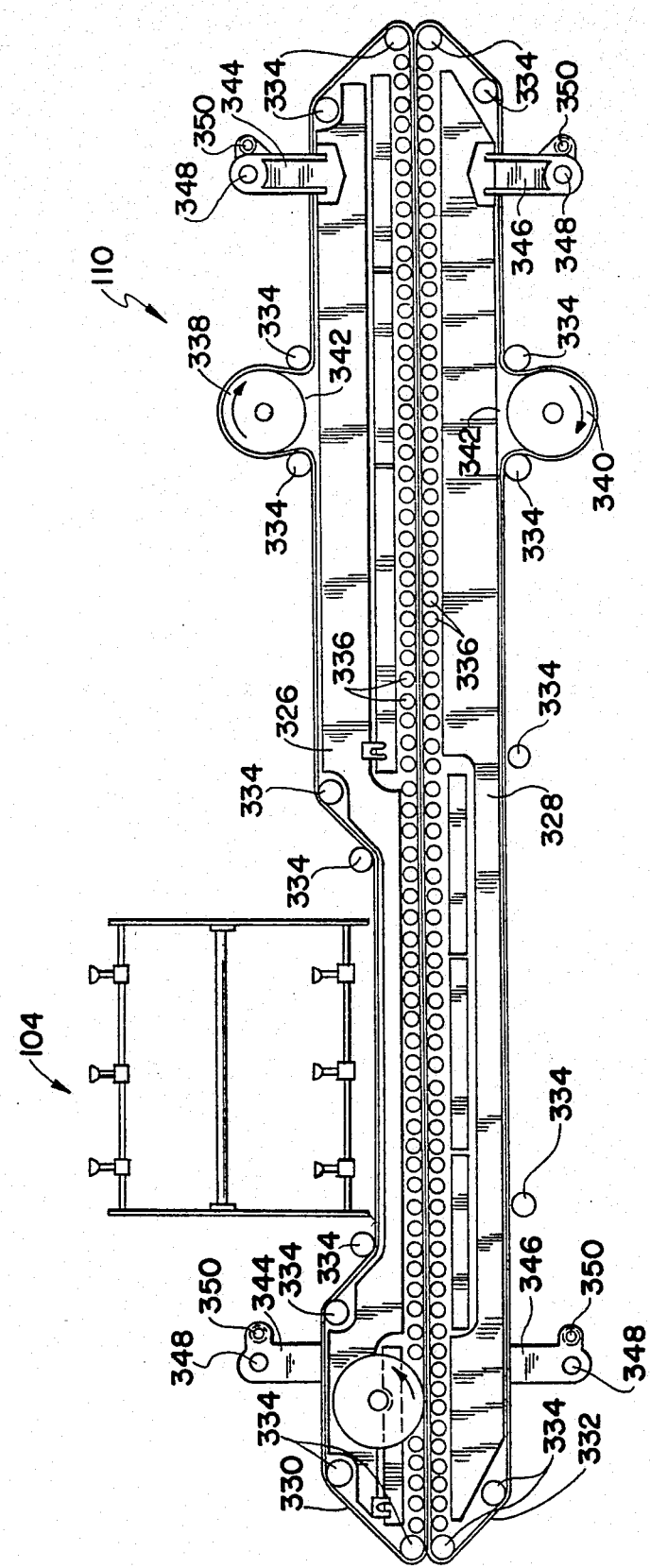
Figure 15:
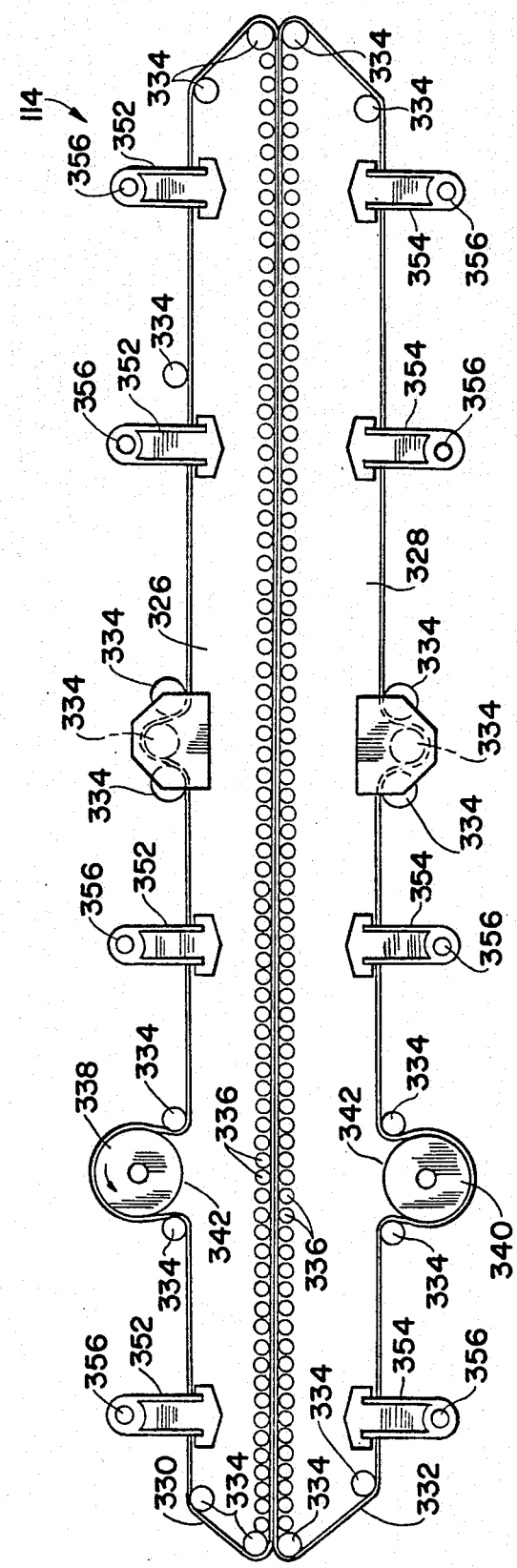

The carrier assemblies 110, 112, 114 are generally disclosed in FIGS. 13, 14 and 15. In this regard, it is noted that the carrier assemblies 110, 112, 114 are generally of similar construction and will therefore be described together where like reference characters will represent like elements. Specifically referring to FIGS. 13, 14 and 15, the carrier assemblies 110, 112, 114 are constructed from a longitudinally extending upper carrier member generally designated by element member 326 and a longitudinally extending coextensive lower carrier member generally designated by element member 328. Positioned about the circumference of the upper carrier member 326 is a continuous upper belt 330 and, likewise, positioned about the circumference of the lower carrier member 328 is a lower continuous belt 332. The upper and lower belts 330, 332 are positioned on the upper and lower carrier members 326, 328 extending over a plurality of rollers 334 and a plurality of spring-loaded rollers 336. The spring-loaded rollers 336 are arranged between the upper and lower carrier members 326, 328 in a manner to maintain the upper and lower belts 330, 332 in generally coextensive contact over the entire length of each of the carrier assemblies 110, 112, 114. The upper and lower belts 330, 332 are respectively driven by an upper and lower belt drive wheel 338, 340 secured to the upper and lower carrier members 326, 328 by a suitable bracket 342.

The carrier assemblies 110, 112, as shown in FIGS. 13 and 14, are adjustably secured between the right and left main side frames 116, 118 of the joining apparatus 110 in an identical manner to that previously described with respect to the register chain assemblies 106, 108. Specifically, the upper and lower carrier members 326, 328 are provided with respective upper and lower mounting and adjusting brackets 344, 346 having a corresponding opening 348 and adjacent threaded opening 350 provided therein. In regard to the carrier assembly 114 shown in FIG. 15, the upper and lower carrier members 326, 328 are provided with a plurality of upper and lower mounting brackets 352, 354 having a single non-threaded opening 356 therein.

Figure 16:
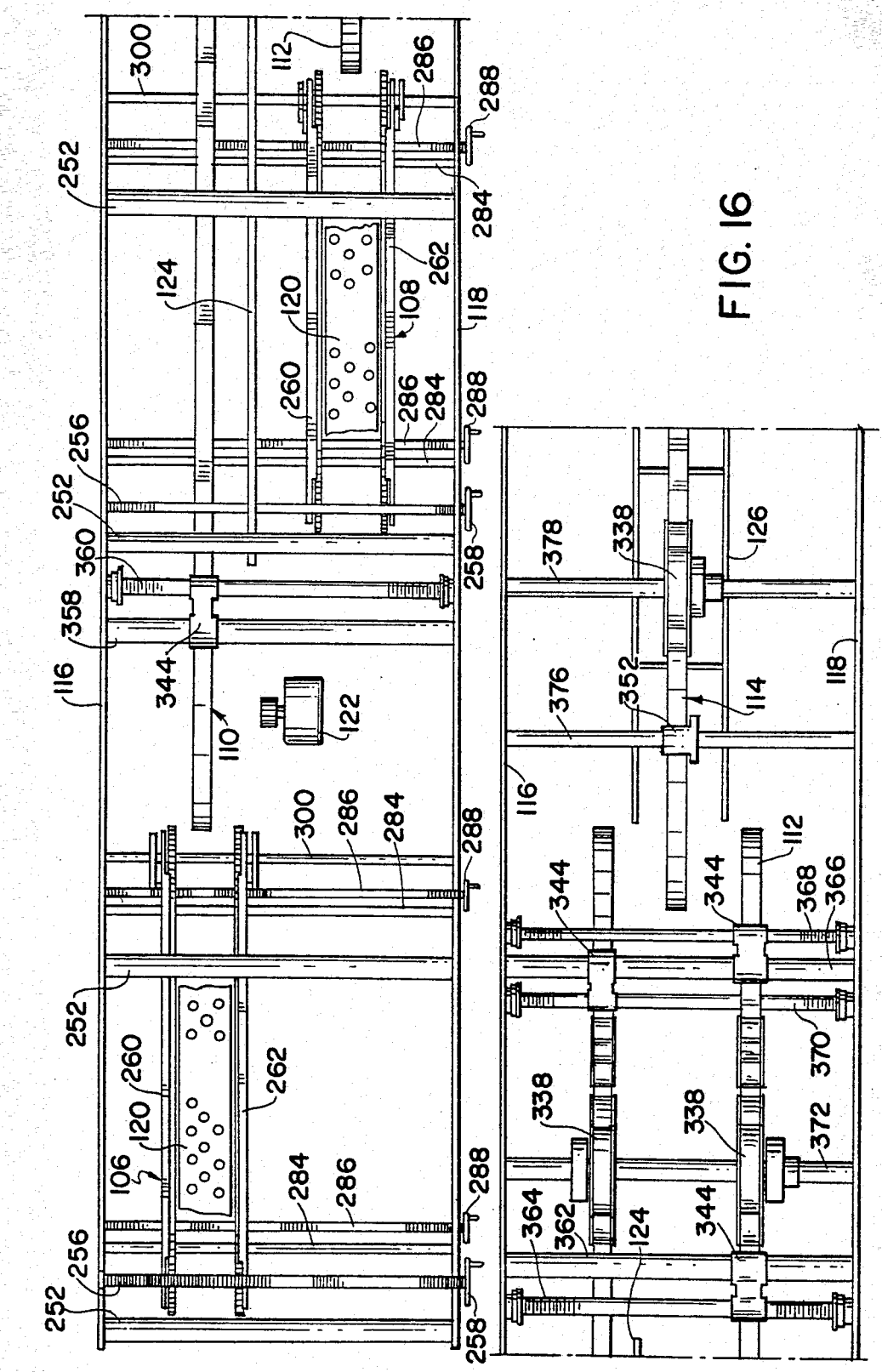
FIG. 16 is a top elevation of the apparatus for joining individual blanks together showing the respective operative alignment between the register chain assemblies and the carrier assemblies, including their adjustable securement to the right and left main side frames.

The adjustable mounting of the upper and lower carrier members 326, 328 of each carrier assemblies 110, 112, 114 spaced in generally parallel paths and extending longitudinally between the right and left main side frames 116, 118 will now be described with reference to FIG. 16. Referring to the top center of FIG. 16, the left end of the carrier assembly 110 is adjustably secured between the right and left main side frames 116, 118 by the engagement of the openings 348 and threaded openings 350 of the mounting and adjusting brackets 344, 346 of the upper and lower carrier members 326, 328 with a slide rod 362 and a threaded rod 364 secured transverse between the right and left main side frames. In a similar arrangement, the left end of the carrier assembly 112 is adjustably secured between the right and left main side frames 116, 118 by the engagement of a slide rod 362 and a threaded rod 364 respectively within the openings 348 and threaded openings 350 of the mounting and adjusting brackets 344, 346 of the upper and lower carrier members 326, 328. Likewise, the right end of the carrier assemblies 110, 112 are adjustably secured between the right and left main side frames 116, 118 by the engagement of the openings 348 of the mounting and adjusting brackets 344, 346 of the upper and lower carrier members 326, 328 with a single common slide rod 366 and the threaded openings 350 of the mounting and adjusting brackets with a respective threaded rod 368, 370. As is thus shown, the carrier assemblies 110, 112 are positioned in generally parallel-sppaced alignment between the right and left main side frames 116, 118. The carrier assemblies 110, 112 are arranged such that their respective upper and lower belt drive wheels 338, 340 are in colinear alignment. In this regard, an upper drive shaft 372 is provided in communication with the upper belt drive wheels 338 for synchronized operation of the upper carrier members 326. A lower drive shaft 374 (see FIG. 1) is provided in communication with the lower belt drive wheels 340 for synchronized operation of the lower carrier members 328.

The upper and lower carrier members 326, 328 of the carrier assembly 114 are similarly adjustably secured between the right and left main side frames 116, 118 by a plurality of slide rods 376 provided in engagement with the openings 356 of the upper and lower mounting brackets 352, 354. An upper drive shaft 378 is provided in engagement with the upper belt drive wheel 338 and a lower drive shaft 380 (see FIG. 1) is provided in engagement with the lower belt drive wheel 340 for respective operation of the upper and lower carrier members 326, 328. As shown in FIG. 16, the right end of the carrier assembly 114 is positioned approximately central between the parallel-spaced carrier assemblies 110, 112. As further shown, register chain assemblies 106, 108 are positioned along respective parallel paths in general parallel alignment with the carrier assemblies 110, 112, 114. In this regard, the register chain assembly 106 is positioned underneath the blank feeding device 102 and terminating adjacent the right end of carrier assembly 110. The register chain assembly 108 is positioned underlying the blank feeding device 104 generally parallel to the carrier assembly 110 and terminating adjacent the right end of carrier assembly 112. Positioned between the register chain assemblies 102, 104 and proximate with the right end of the carrier assembly 110 is the adhesive applicator 122. As to be further described, the displacing bar 124 is secured to the carrier assembly 110 and longitudinally extending therewith.

Figure 17:
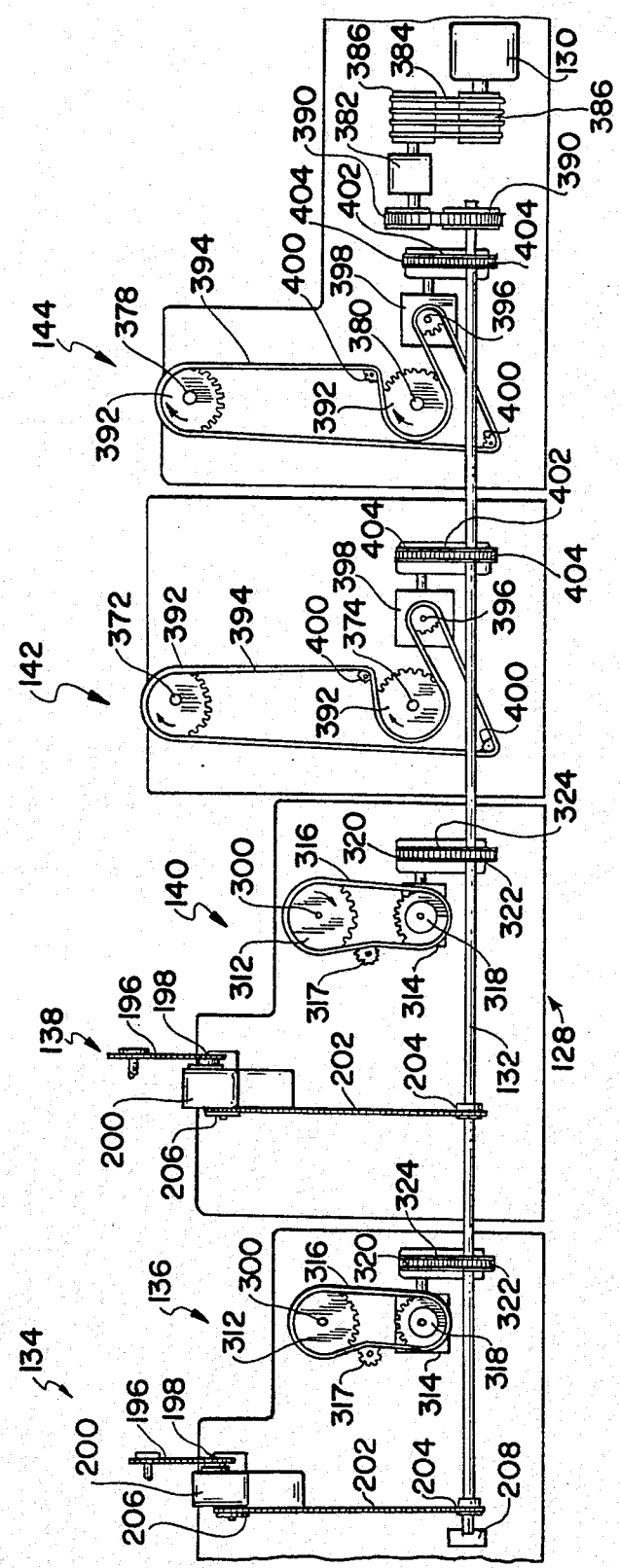
FIG. 17 is a side elevation of the main drive shaft including the various gear and chain drive assemblies coupled thereto for operation of the register chain assemblies, carrier assemblies and blank feeding devices.

Referring to FIG. 17, the coupling of the motor 130 to the blank feeding devices 102, 104, the register chain assemblies 106, 108 and carrier assemblies 110, 112, 114 by gear and chain assemblies 134, 136, 138, 140, 142, 144 of the main drive assembly 128 will now be described. The motor 130 is connected to a gear reducer 382 via a plurality of belts 384 which couples together a pair of pulleys 386 which are connected to the motor and gear reducer. The gear reducer 382 in turn is connected to the main drive shaft 132 via belt 388 which couples together a pair of pulleys 390 which are connected to the gear reducer and the main drive shaft. The connecting of the main drive shaft 132 to the blank feeding devices 102, 104 and register chain assemblies 106, 108 have been previously described in regard to the gear and chain assemblies 134, 136, 138, 140 and accordingly will not be repeated hereat. The gear and chain assembly 142 for the carrier assemblies 110, 112 will now be described. The upper and lower drive shafts 372, 374 for the upper and lower carrier members 326, 328 of the carrier assemblies 110, 112 are connected to a respective upper and lower drive gear 392. A double-sided belt 394 is arranged connecting the upper and lower drive gears 392 to a gear 396 provided on a gear reducer 398 and a pair of take-up gears 400. The gear reducer 398 is connected in turn to the main drive shaft 132 via a belt 402 which connects a pair of gears 404 connected to the gear reducer and the main drive shaft. It is thus apparent that the rotation of the main drive shaft 132 is operative to drive simultaneously the upper and lower belts 330, 332 of the upper and lower carrier members 326, 328 of the carrier assemblies 110, 112 in timed synchronized relationship. Likewise, the upper and lower drive shafts 378, 380 connected to the upper and lower carrier members 326, 328 of the carrier assembly 114 are connected to the main drive shaft 132 by gear and chain assembly 144 in an identical manner to the gear and chain assembly 142 as shown in FIG. 17. It is readily apparent that the blank feeding devices 102, 104, the register chain assemblies 106, 108 and carrier assemblies 110, 112, 114 are all operated in timed synchronized relationship via their connection to a single main drive shaft 132 for the joining apparatus 110. Still further, the use of a single double-sided belt 394 and common respective upper and lower drive shafts 372, 374 for operation of the carrier assemblies 110, 112 results in their likewise timed synchronized operation.

Figure 18:
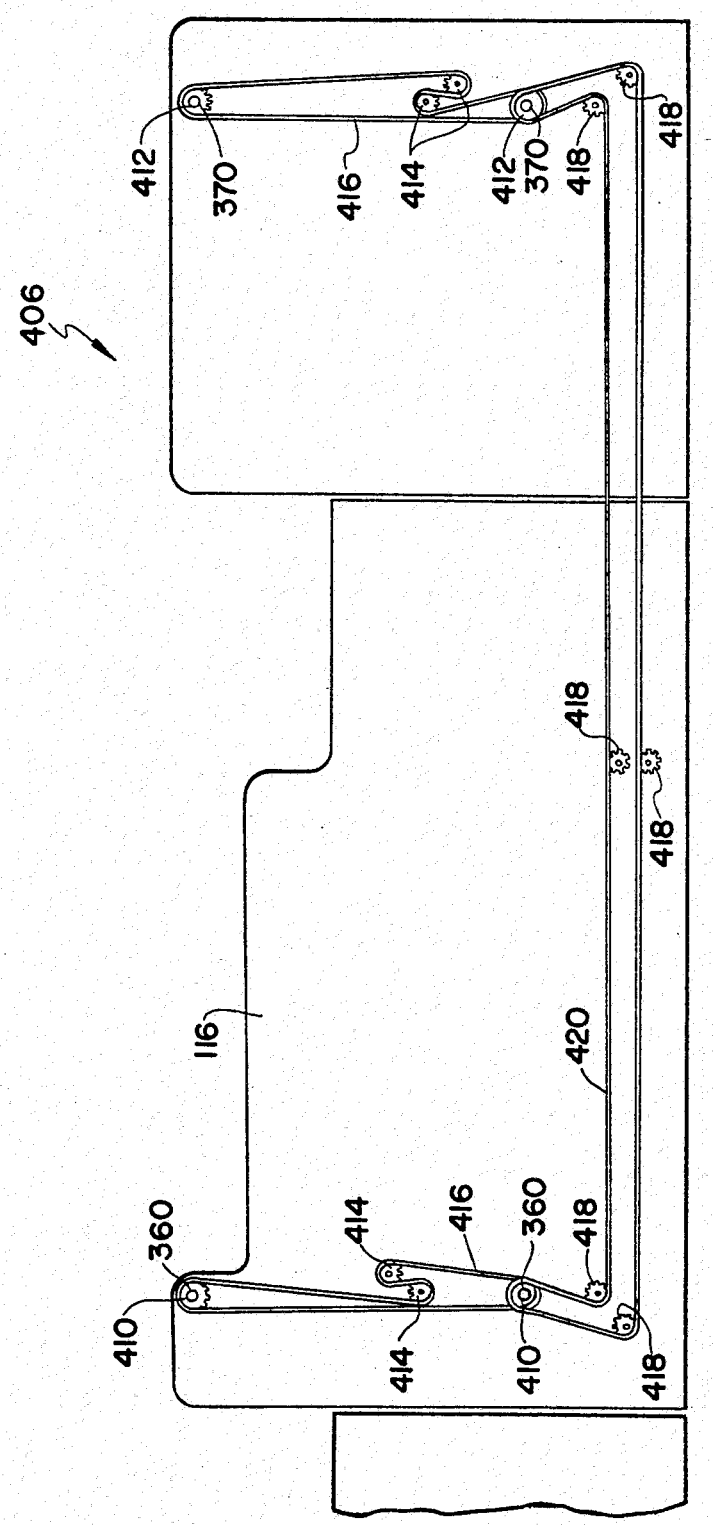
FIGS. 18 and 19 are side elevations of the gear and chain alignment assemblies for positioning the carrier assemblies between the right and left main side frames in operative alignment with the register chain assemblies; and, FIGS. 20a–20k are various operating views showing the joining of individual blanks together along overlapping edge portions thereof by a suitable bonding agent in accordance with the apparatus and method of the present invention.
Figure 19:
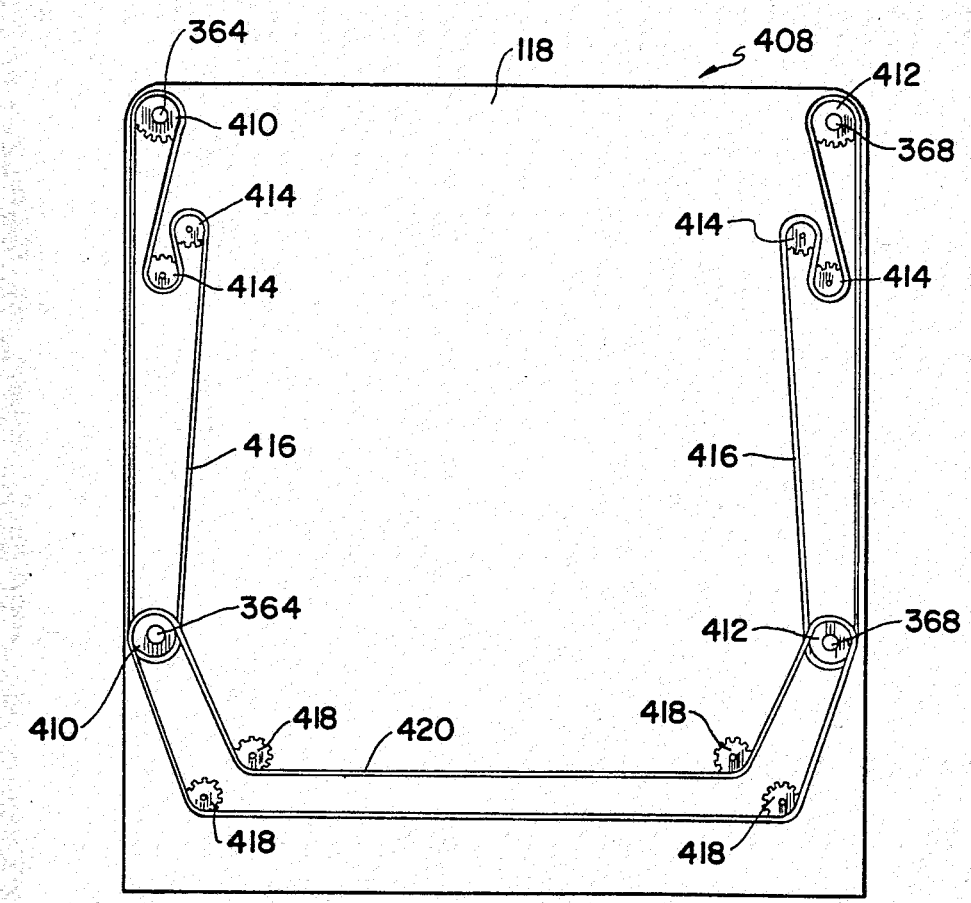

Referring to FIGS. 18 and 19, gear and chain alignment assemblies 406, 408 are generally shown. The gear and chain alignment assembly 406 of FIG. 18 is adapted to align simultaneously the right and left ends of the upper and lower carrier members 326, 328 of the carrier assembly 110 between the right and left main side frames 116, 118. In this regard, a pair of gears 410 are individually secured to the threaded rods 360 for alignment of the left ends of the upper and lower carrier members 326, 328 and a pair of gears 412 are individually secured to the threaded rods 370 for alignment of the right ends of the upper and lower carrier members. The threaded rods 360, 370 for the left and right ends of the upper and lower carrier members 326, 328 are respectively connected via take-up gears 414 and chains 416. The threaded rods 360, 370 for the respective right and left ends of the lower carrier member 328 of the carrier assembly 110 are connected via plurality of gears 418 and chain 420. The gear and chain alignment assembly 408 for the upper and lower carrier members 326, 328 of the carrier assembly 112 is constructed and arranged in a similar manner as shown in FIG. 19 and accordingly will not be described. It is readily apparent from the gear and chain alignment assemblies 406, 408, as shown in FIGS. 18 and 19, that the adjustment of either end of either the upper or lower carrier members 326, 328 by rotation of any one of the threaded rods 360, 370 automatically adjusts the entire carrier assembly 110, 112 such that the upper and lower carrier members are maintained in precision alignment with each other.

In accordance with the present invention, there has been thus far described an apparatus for aligning and joining individual blanks together along an overlapping edge portion thereof by a bonding agent. The apparatus is constructed from means for individually providing a first and second blank from a respective source thereof to be aligned and joined with respect to each other; means for individually receiving the first and second blanks from the respective source thereof and for conveying the blanks in substantially parallel paths in a substantially common plane; means for bending an edge portion of the first blank out of the common plane containing the remaining portion of the first blank, the edge portion of the first blank having a bonding agent provided on at least a portion thereof by a bonding agent applicator; means for aligning the first and second blanks such that an edge portion of the second blank is adapted to align overlapping the displaced edge portion of the first blank having the bonding agent thereon and wherein the blanks are joined together by the bonding agent upon contact of the overlapping portion; means for conveying the first and second blanks along substantially parallel paths in the substantially common plane while the blanks are aligned and are being joined together in overlapping relationship; and, means for applying a compressive force along the joined overlapping edge portions of the blanks to maintain the blanks in joined relationship for a sufficient time to allow the bonding agent to secure the blanks together.

The method of joining together individual blanks along an overlapping edge portion thereof by a suitable bonding agent in accordance with the present invention will now be described in detail with reference generally to FIGS. 20a through 20k. Initially, as shown in FIG. 2, a supply of blanks 226 are placed within a respective blank supply hopper 152 of the blank feeding devices 102, 104 and secured thereat by the engagement of the lower and upper fingers 228, 230 with the first blank of the stack. Rotation of the blank picker 146 about shaft 184 in a clockwise direction causes rotation of the vacuum grabbers 164 about the support rods 158 in a counterclockwise direction as previously described. In this regard, the vacuum grabbers 164 extend from the blank picker 146 sufficiently such that the suction cups 174 engage the central portion of the first blank within the blank supply hopper 152. The vacuum grabbers 164 secure the first blank to the suction cups 174 by vacuum supplied thereto through the manifold 180, manifold supply lines 182, vacuum bearings 162 and vacuum supply lines 178. Continued clockwise rotation of the blank picker 146 and counterclockwise rotation of the vacuum grabbers 164 cause removal of the first blank from engagement with the lower and upper fingers 228, 230 as the first blank is bowed outwardly from its original planar position within the stack.

Further continued clockwise rotation of the blank picker 146 causes the vacuum grabbers 164 to position the blank overlying the register chain assemblies 106, 108. At such position, the vacuum manifold 180 communicates a source of atmospheric pressure to the suction cups 174 thereby causing the blank to disengage from the vacuum grabbers 164 and to be placed centrally located across the top edge of the frame members 260, 262 of the register chain assemblies 106, 108 as generally shown in FIGS. 9 and 10. The proper positioning of the blank on a respective register chain assembly 106, 108 is accomplished by the coordinated adjustment of a respective blank feeding device 102, 104 with a respective underlying register chain assembly 106, 108 between the right and left main side frames 116, 118 of the joining apparatus 110 in the manner previously described.

Referring to FIG. 10, the first blank 422 is conveyed along the register chain assembly 106 by the pair of lugs 280 extending from the chains 276, 278 and maintained thereon by the operation of the vacuum table 120 as optionally provided. As the first blank 422 is conveyed along the register chain assembly 106, it may be required that a further precision alignment of the blank be provided. In this regard, the alignment guides 294, 296 have been secured to the register chain assembly 106 as previously described. As shown in FIG. 10, the alignment guides 294, 296 are operative to shift the first blank 422 into a more precise or accurate position on the register chain assembly 106 than that which had previously been accomplished by the blank feeding device 102.

Figure 20A:
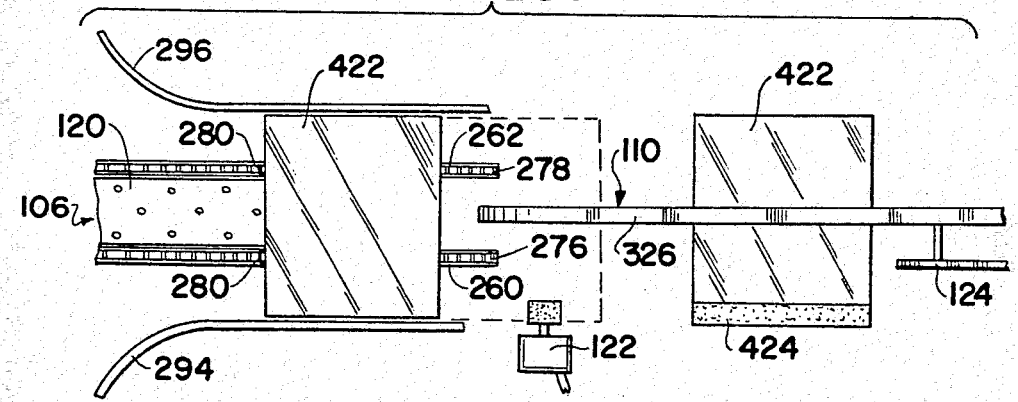

Referring specifically to FIG. 20a, the first blank 422 is shown precisely aligned on the register chain assembly 106 at the left end thereof between the alignment guide 294, 296. As the first blank 422 leaves the register chain assembly 106, the leading edge thereof is engaged between the upper and lower carrier members 326, 328 of the carrier assembly 110. The first blank 422 is conveyed by its confinement between the rotating upper and lower belts 330, 332 of the carrier assembly 110. As the first blank 422 is conveyed past the adhesive applicator 122, a layer of suitable adhesive 424 is applied along the top edge portion of the blank. Although the adhesive applicator 122 is illustrated of the wheel or disc type, it is contemplated that an adhesive applicator of the spray or other such type may be employed. It is also contemplated that where two blanks of materials capable of being heat sealed are being joined, a heat sealing attachment may be used for bonding the blanks together after they have been aligned, instead of using an adhesive application.

Figures 20B, 20D:
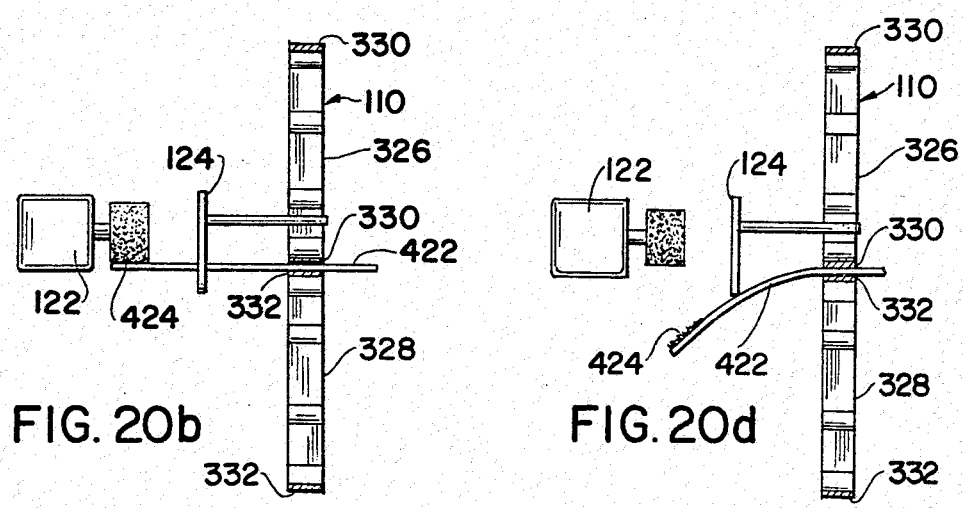
Figure 20C:
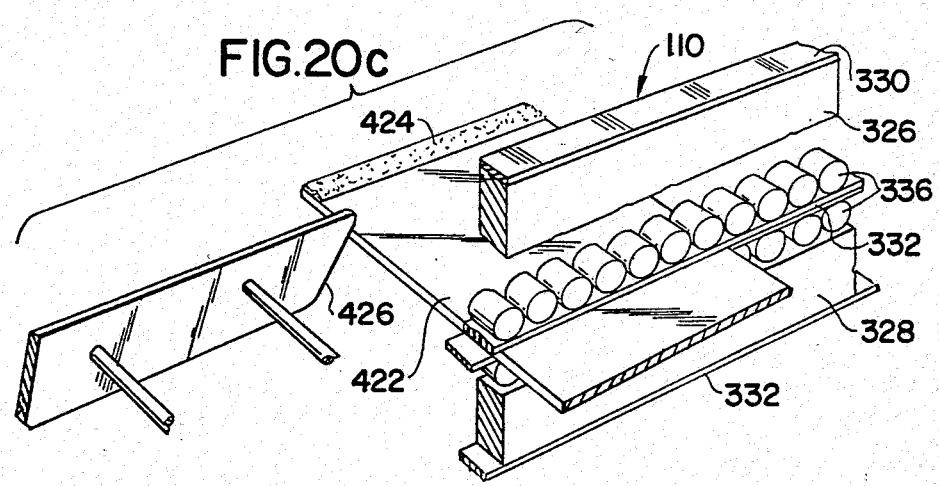
Figure 20E:
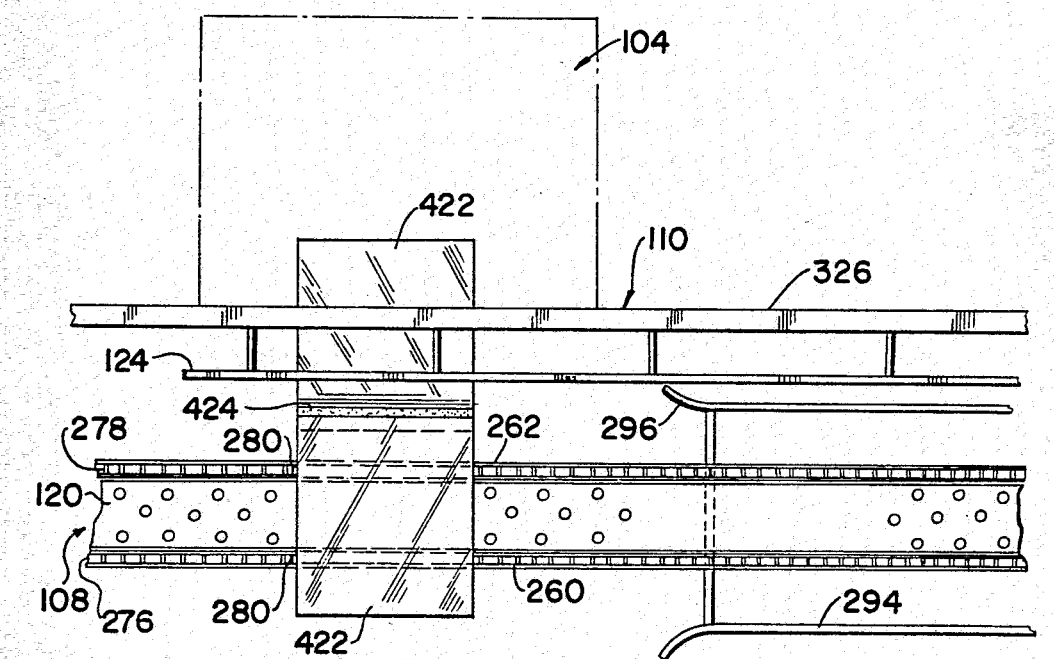

As shown in FIGS. 20b and 20c, the carrier assembly 110 conveys the first blank 422 such that the leading edge of the blank adjacent the adhesive layer 424 engages the leading angular edge 426 of the displacing bar 124. The displacing bar 124 is effective to displace the edge portion of the first blank 422 having the adhesive layer 424 thereon away from the plane containing the remaining portion of the blank as more clearly shown in FIG. 20d. The first blank 422 having its edge portion provided with an adhesive layer 424 displaced from the plane containing the remaining portion thereof is conveyed underlying the blank feeding device 104 adjacent the register chain assembly 108 as shown in FIG. 20e. The blank feeding device 104 removes a second blank 422 from the blank supply hopper 152 by the blank picker 146 via the vacuum grabber 164 in an identical manner as previously described with respect to the first blank 422. The second blank 422 is placed onto the register chain assembly 108 in general alignment with the first blank 422 being conveyed along by the carrier assembly 110 in generally overlapping relationship.

The first and second blanks 422 are provided underlying the blank feeding device 104 in general alignment with each other by the timed operation of the joining apparatus 100 due to the use of a single main drive shaft 132 for timed synchronized operation of the register chain assemblies 106, 108, carrier assembly 110 and blank feeding devices 102, 104. As shown, the second blank 422 is slightly out of alignment in its overlapping relationship with the first blank 422 by not completely overlapping the adhesive layer 424 provided on the edge portion thereof. In this regard, the alignment guides 294, 296 are provided at the right end of the register chain assembly 108 to shift the second blank 422 into proper alignment as shown in FIG. 20f if required.

Figure 20F:
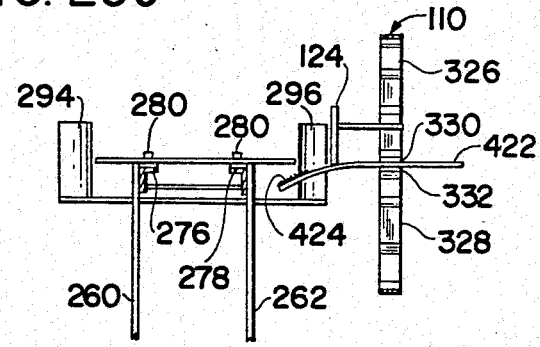

Referring to FIG. 20f, the first and second blanks 422 are arranged in substantially the same plane except for the edge portion of the first blank having the adhesive layer 424 thereon. In this regard, the first and second blanks 422 are being conveyed by the respective carrier assembly 110 and register chain assembly 108 along substantially parallel paths with the right edge of the second blank overlapping substantially the entire adhesive layer 424 provided on the first blank. The first and second blanks 422 are conveyed through the joining apparatus 100 in side-by-side relationship. As the second blank 422 leaves the carrier chain assembly 108, the leading edge thereof engages the carrier assembly 112 in the manner previously described with respect to the first blank 422 and the carrier assembly 110.

Figure 20G:
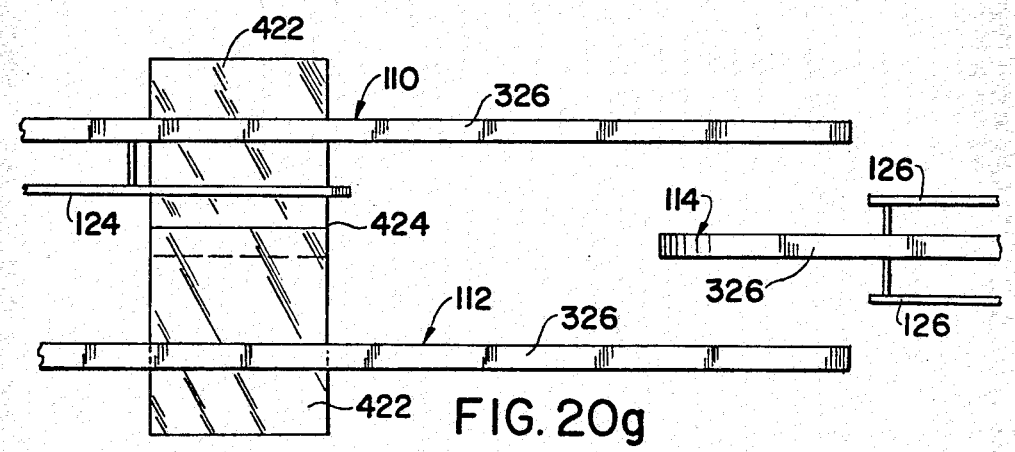
Figure 20H:
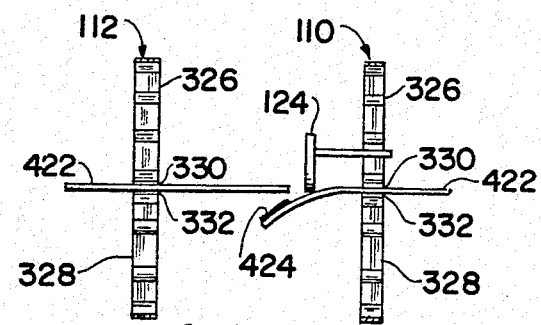

As shown in FIG. 20g, the first and second blanks 422 are conveyed by the carrier assemblies 110, 112 along substantially parallel paths with the edge portion having the adhesive layer 424 on the first blank being displaced from the common plane containing both the remaining portion thereof and the second blank by its engagement with the displacing bar 124. This is further shown in FIG. 20h.

Figure 20I:
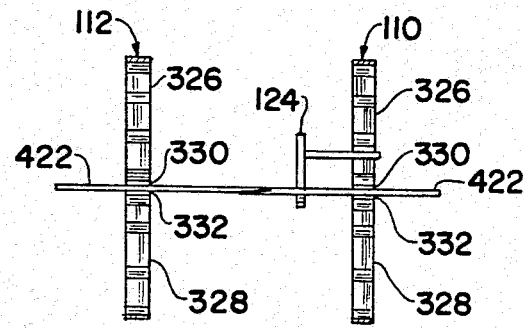
Figure 20J:
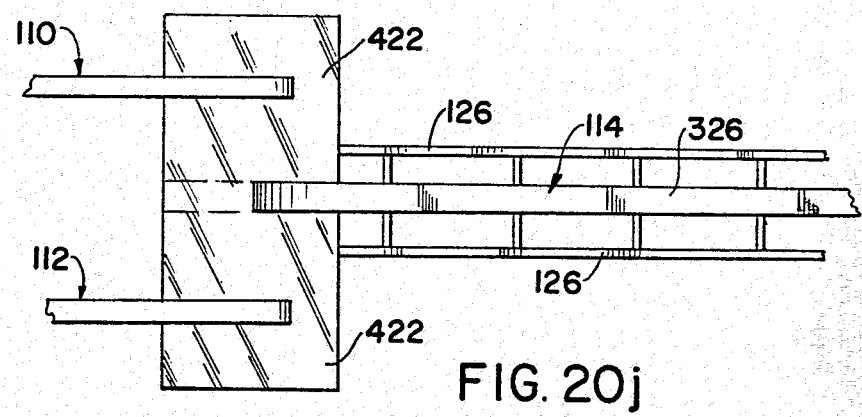

As the carrier assemblies 110, 112 convey the first and second blanks 422 therealong past the longitudinal extent of the displacing bar 124, the resilient material construction of the first blank 422 causes the edge portion having the adhesive layer 424 thereon to spring upward into the common plane containing the remaining portion thereof and to contact the bottom surface of the second blank as shown in FIG. 20i. In this regard, the first and second blanks 422 are now joined in overlapping relationship by the adhesive layer 424. Although not shown, it is contemplated that a second displacing bar can be provided to operate in an opposite manner to that of the displacing bar 124 so as to force the edge portion of the first blank 422 having the adhesive layer 424 thereon upward from its displaced position into the plane containing the remaining portion thereof and into contact with the bottom overlapping portion of the second blank 422. It is further noted that the adhesive layer 424 may be applied to the bottom surface of the first blank 422 such that the displacing bar 124 is operative to displace the edge portion upward from the plane containing the remaining portion thereof as opposed to being displaced downwardly as shown. Thus, the adhesive layer 424 would join the first blank 422 to the top surface of the second blank 422.

Figure 20K:
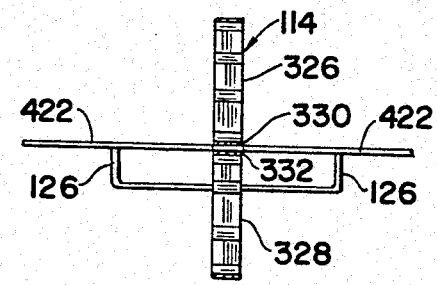

The final step in accordance with the method of the present invention is to apply a compressive force along the overlapping edge portions of the first and second blanks 422 for a sufficient time to allow the adhesive provided therebetween to secure the blanks together. Specifically referring to FIG. 20i, the first and second blanks 422 are conveyed by the carrier assemblies 110, 112 along substantially parallel paths in a common plane until the leading edge thereof at the overlapping portion is engaged by the carrier assembly 114 in a manner previously described with respect to the carrier assembly 110, 112 and the first and second blanks 422. The first and second blanks 422 are conveyed along the carrier assembly 114 which applies a slight compressive force to the overlapping portion thereof to maintain the blanks in their joined relationship. The length of the carrier assembly 114 is sufficient to allow the adhesive to sufficiently dry or cure prior to discharging the joined blanks therefrom. In addition, suitable heating means such as heating lamps may be provided along the carrier assembly 114 to aid in the curing or drying of the adhesive layer. As is shown in FIG. 20k, pontoons 126 on either side of the carrier assembly 114 are provided to maintain the first and second blanks 422 in a substantially common plane as they are conveyed by the carrier assembly to prevent bending thereof.

As thus far described, the register chain assemblies 106, 108 and carrier assemblies 110, 112, 114 are arranged to convey the blanks 422 along substantially parallel paths while maintaining such blanks in a substantially common plane. In this regard, only the edge portion of the first blank 422 having an adhesive layer 424 thereon is displaced from such common plane by the displacing bar 124.

There has thus been presented a method for aligning and joining individual blanks together along an overlapping edge portion thereof by a bonding agent in accordance with the present invention. The method comprises the steps of individually providing a first and second blank from a respective source thereof to be aligned and joined with respect to each other; individually receiving the first and second blanks from the respective source thereof and conveying the blanks in substantially parallel paths in a substantially common plane; bending an edge portion of the first blank out of the common plane containing the remaining portion of the first blank, the edge portion of the first blank having a bonding agent provided on at least a portion thereof; aligning the first and second blanks such that an edge portion of the second blank is adapted to align overlapping the displaced edge portion of the first blank having the bonding agent thereon and wherein the blanks are joined together by the bonding agent upon contact of the overlapping portions; conveying the first and second blanks along substantially parallel paths in the substantially common plane while the blanks are joined together; and, applying a compressing force along the joined overlapping edge portions of the blanks to maintain the blanks in joined relationship for a sufficient time to allow the bonding agent to secure the blanks together.

Although the invention herein has been described with reference to particular embodiments, it is to be understood that these embodiments are merely illustrative of the principles and application of the present invention. As shown in FIG. 20b, the adhesive applicator 122 is positioned to apply a layer of adhesive 424 along the outside edge of the blank 422. However, the adhesive applicator 122 may be positioned so as to apply such layer of adhesive 424 other than along such outside edge, for example, along a more central region of the blank 422. In this manner, a pair of blanks 422 may be joined together other than along their respective outside edges if desired in accordance with a specific application. It is also contemplated that the layer of adhesive 424 can be applied to the underside of one of the blanks 422 where the displacing bar 124 is operative to bend the blank upwardly away from the plane containing the remaining portion thereof so as to allow alignment between the pair of blanks without interference by the layer of adhesive. It is further contemplated that the layer of adhesive 424 may be applied to the blank 422 which is not displaced by the displacing bar 124, while the other blank not having the adhesive layer thereon is engaged by the displacing bar in a manner to allow the alignment of such blanks without interference by the layer of adhesive. It is further contemplated that the need for the displacing bar 124 may be eliminated by feeding the two blanks onto different planes and positioning the carrier assemblies 110, 112 so that they converge toward a common plane and thereby align and join the blanks. Even still further, is contemplated that other variations in the described embodiments regarding the application of an adhesive layer 424 to a blank 422 and, the displacing of a portion of a blank by a displacing bar 124 may be employed in accordance with the joining apparatus and method of the present invention without departing from the spirit and scope thereof.

Accordingly, it is to be understood that numerous modifications may be made in the illustrative embodiments and other arrangements may be devised without departing from the spirit and scope of the present invention as defined by the appended claims.

What is claimed is:

1. An apparatus for joining individual blanks together and having an operative direction, said individual blanks being conveyed through said apparatus along said operative direction, said apparatus comprising means for providing a first and second blank of self-supporting material, means for displacing at least a portion of said first blank substantially along said operative direction of said apparatus and away from at least a portion of said second blank, and means for arranging said first and second blanks such that said displaced portion of said first blank is arranged in alignment with a portion of said second blank such that said blanks can be joined together in said alignment by a bonding agent provided therebetween.

2. The apparatus as set forth in claim 1 wherein said arranging means include means for conveying said first and second blanks along substantially parallel paths in a substantially common plane during at least said joining thereof.

3. The apparatus as set forth in claim 1 or 2 further including means for applying said bonding agent along at least a portion of one of said blanks.

4. The apparatus as set forth in claim 1 or 2 wherein said displacing means is adapted to bend said portion of said first blank away from a plane containing the remaining portion thereof.

5. The apparatus as set forth in claim 2 wherein said conveying means comprise first and second register chain assemblies and first and second carrier assemblies.

6. The apparatus as set forth in claim 1 wherein said first blank is displaced away from said second blank upon its provision by said providing means.

7. The apparatus as set forth in claim 1 or 6 wherein said arranging means includes means for conveying said blanks along converging non-parallel paths toward a common plane until said blanks converge and are joined together.

8. An apparatus for joining individual blanks together in overlapping relationship and having an operative direction, said individual blanks being conveyed through said apparatus along said operative direction, said apparatus comprising means for providing a first and second blank of self-supporting material, means for displacing at least a portion of said first blank substantially along said operative direction of said apparatus and away from at least a portion of said second blank, means for applying a bonding agent to a portion of one of said blanks, and means for arranging said first and second blanks such that said displaced portion of said first blank is arranged in alignment with a portion of said second blank such that said blanks are joined together in aligned overlapping relationship by said bonding agent upon contact of said blanks.

9. The apparatus as set forth in claim 8 further including means for conveying said first and second blanks along substantially parallel paths in substantially common planes at least while said blanks are joined in overlapping relationship.

10. The apparatus as set forth in claim 8 or 9 further including means for applying a compressive force along the overlapping portion of said first and second blanks to maintain said blanks in joined relationship.

11. The apparatus as set forth in claim 10 wherein said applying means includes means for maintaining said first and second blanks in substantially common planes during said applying of compressive force.

12. The apparatus as set forth in claim 8 or 9 wherein said displacing means is adapted to bend an edge portion of said first blank away from a plane containing the remaining portion thereof.

13. The apparatus as set forth in claim 12 further including second displacing means adapted to bend said displaced portion of said first blank into the plane containing the remaining portion thereof and into contact with an overlapping portion of said second blank.

14. The apparatus as set forth in claim 8 wherein said first blank is displaced away from said second blank upon its provision by said providing means.

15. The apparatus as set forth in claim 8 or 14 wherein said arranging means includes means for conveying said blanks along converging non-parallel paths toward a common plane until said blanks converge and are joined together.

16. An apparatus for joining individual first and second blanks together in overlapping relationship along a portion thereof and having an operative direction, said apparatus comprising means for individually providing a first and second blank of self-supporting material from a source thereof, means for receiving said first and second blanks from said providing means and for conveying said blanks along substantially parallel paths in a substantially common plane along said operative direction of said apparatus, means for displacing a portion of one of said blanks substantially along said operative direction of said apparatus and away from said common plane containing the remaining portion of said one blank, and means for positioning said first and second blanks such that a portion of the other blank is adapted to align overlapping said displaced portion of said one blank such that said blanks can be joined together by a bonding agent provided therebetween upon contact of said overlapping portion.

17. The apparatus as set forth in claim 16 wherein said receiving means further includes means for conveying said blanks along substantially parallel paths in a substantially common plane at least while said blanks are aligned and are being joined in overlapping relationship.

18. The apparatus as set forth in claim 16 or 17 further including means for applying a compressive force along the overlapping portion of said first and second blanks to maintain said blanks in joined relationship for a sufficient period to allow said bonding agent to secure said blanks together.

19. The apparatus as set forth in claim 16 or 17 further including means for applying said bonding agent along at least a portion of one of said blanks at a location where said first and second blanks overlap.

20. An apparatus for aligning and joining individual blanks together along an overlapping portion thereof by a bonding agent and having an operative direction, said apparatus comprising means for individually providing a first and second blank of self-supporting material from a source thereof to be aligned and joined with respect to each other, means for individually receiving said first and second blanks from said source thereof and for conveying said blanks in substantially parallel paths in a substantially common plane along said operative direction of said apparatus, means for bending a portion of one of said blanks out of said common plane containing the remaining portion of said blank substantially along said operative direction of said apparatus, means for applying a bonding agent on at least a portion of one of said blanks, means for aligning said first and second blanks such that said displaced portion of said one blank is adapted to align overlapping a portion of the other blank where said bonding agent has been applied such that said blanks are joined together by said bonding agent upon contact of said overlapping portion, means for conveying said first and second blanks along substantially parallel paths in said substantially common plane while said blanks are aligned and are being joined together in overlapping relationship, and means for applying a compressive force along the joined overlapping portion of said blanks to maintain said blanks in joined relationship for a sufficient time to allow said bonding agent to secure said blanks together.

21. The apparatus as set forth in claim 20 further including means for maintaining said first and second blanks in contact with said receiving means while said first and second blanks are conveyed therealong.

22. The apparatus as set forth in claim 21 wherein said maintaining means includes a vacuum table.

23. A method for joining individual blanks together, said individual blanks being conveyed through an apparatus along its operative direction, said method comprising the steps of providing a first and second blank of self-supporting material, displacing at least a portion of said first blank substantially along said operative direction of said apparatus and away from at least a portion of said second blank, arranging said first and second blanks such that said displaced portion of said first blank is arranged in alignment with a portion of said second blank such that said blanks can be joined together in said alignment by a bonding agent provided therebetween.

24. The method as set forth in claim 23 further including conveying said first and second blanks along substantially parallel paths in a substantially common plane during at least said joining thereof.

25. The method as set forth in claim 23 further including the step of applying said bonding agent along at least a portion of one of said blanks.

26. The method as set forth in claim 23 wherein said displacing of at least a portion of said first blank away from at least a portion of said second blank includes providing said blanks in substantially non-parallel planes.

27. The method as set forth in claim 23 or 26 wherein said arranging of said first and second blanks includes conveying said blanks along converging non-parallel paths toward a common plane until said blanks converge and are joined together.

28. The method as set forth in claim 23 wherein said joined individual blanks form at least a portion of an outer wall of a carton constructed therefrom.

29. A method for joining individual blanks together in overlapping relationship, said method comprising the steps of providing a first and second blank of self-supporting material, conveying said individual blanks through an apparatus along its operative direction, applying a bonding agent to a portion of one of said blanks, displacing a portion of one of said blanks substantially along said operative direction of said apparatus and away from the remaining portion thereof, arranging said first and second blanks such that said displaced portion of said one blank is arranged in alignment with a portion of the other blank such that said blanks are joined together in aligned overlapping relationship by said bonding agent upon contact of said overlapping portion of said blanks, and conveying said first and second blanks along substantially parallel paths in a substantially common plane while said blanks are joined in overlapping relationship.

30. The method as set forth in claim 28 or 29 further including displacing said displaced portion of said one blank into the plane containing the remaining portion thereof and into contact with the overlapping portion of said other blank.

31. The method as set forth in claim 28 further including the step of applying a compressive force along the overlapping portion of said first and second blanks to maintain said blanks in joined relationship.

32. The method as set forth in claim 29 wherein said joined individual blanks form at least a portion of an outer wall of a carton constructed therefrom.

33. A method for joining individual first and second blanks together in overlapping relationship along a portion thereof, said method comprising the steps of individually providing a first and second blank of self-supporting material from a source thereof, receiving a first and second blank from said providing means and conveying said blanks along substantially parallel paths in a substantially common plane through an apparatus along its operative direction, applying a bonding agent along a portion of one of said blanks, displacing a portion of one of said blanks away from said common plane containing the remaining portion of said one blank substantially along said operative direction of said apparatus, positioning said first and second blanks such that a portion of the other blank is adapted to align overlapping the displaced portion of said one blank such that said blanks are joined together by said bonding agent upon contact of the overlapping portion of said blanks, and applying a compressive force along the overlapping portion of said first and second blanks to maintain said blanks in joined relationship for a sufficient period to allow said bonding agent to secure said blanks together.

34. The method as set forth in claim 33 wherein said joined individual blanks form at least a portion of an outer wall of a carton constructed therefrom.

35. A method for aligning and joining individual blanks together along an overlapping portion thereof by a bonding agent, said method comprising the steps of individually providing a first and second blank of self-supporting material from a source thereof to be aligned and joined with respect to each other, individually receiving said first and second blanks from said source thereof and conveying said blanks in substantially parallel paths in a substantially common plane through an apparatus along its operative direction, bending a portion of one of said blanks out of said common plane containing the remaining portion of said one blank substantially along said operative direction of said apparatus, applying a bonding agent to a portion of one of said blanks, aligning said first and second blanks such that a portion of the other blank is adapted to align overlapping said displaced portion of said one blank such that said blanks are joined together by said bonding agent upon contact of said overlapping portion of said blanks, conveying said first and second blanks along substantially parallel paths in said substantially common plane while said blanks are joined together, and applying a compressive force along the joined overlapping portion of said blanks to maintain said blanks in joined relationship for a sufficient time to allow said bonding agent to secure said blanks together.

36. The method as set forth in claim 35 wherein said joined individual blanks form at least a portion of an outer wall of a carton constructed therefrom.

* * * * *

UNITED STATES PATENT AND TRADEMARK OFFICE
CERTIFICATE OF CORRECTION

PATENT NO. : 4,518,379
DATED : May 21, 1985
INVENTOR(S) : Charles W. Eldridge

It is certified that error appears in the above-identified patent and that said Letters Patent are hereby corrected as shown below:

In Column 22, lines 25 through 33, which reads:

"30. The method as set forth in claim 28 or 29 further including displacing said displaced portion of said one blank into the plane containing the remaining portion thereof and into contact with the overlapping portion of said other blank.

31. The method as set forth in claim 28 further including the step of applying a compressive force along the overlapping portion of said first and second blanks to maintain said blanks in joined relationship."

should read as follows:

--30. The method as set forth in claim 29 further including the step of applying a compressive force along the overlapping portion of said first and second blanks to maintain said blanks in joined relationship.

31. The method as set forth in claim 29 or 30 further including displacing said displaced portion of said one blank into the plane containing the remaining portion thereof into contact with the overlapping portion of said other blank.--

Signed and Sealed this

Twelfth Day of November 1985

[SEAL]

Attest:

Attesting Officer

DONALD J. QUIGG

Commissioner of Patents and Trademarks